US010873904B2

(12) United States Patent
Ly et al.

(10) Patent No.: US 10,873,904 B2
(45) Date of Patent: *Dec. 22, 2020

(54) CHIRP SIGNAL FORMATS AND TECHNIQUES

(71) Applicant: QUALCOMM Incorporated, San Diego, CA (US)

(72) Inventors: Hung Dinh Ly, San Diego, CA (US); Keiichi Kubota, Tokyo (JP); Tingfang Ji, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/406,628

(22) Filed: May 8, 2019

(65) Prior Publication Data

US 2019/0268841 A1   Aug. 29, 2019

Related U.S. Application Data

(63) Continuation of application No. 15/289,651, filed on Oct. 10, 2016, now Pat. No. 10,334,519.
(Continued)

(51) Int. Cl.
*H04W 52/02* (2009.01)
*H04W 48/14* (2009.01)
(Continued)

(52) U.S. Cl.
CPC ........ *H04W 52/0203* (2013.01); *H04H 20/38* (2013.01); *H04W 28/0278* (2013.01);
(Continued)

(58) Field of Classification Search
CPC ........ H04H 20/38; H04Q 2213/13215; H04W 28/0278; H04W 48/14; H04W 52/0203;
(Continued)

(56) References Cited

U.S. PATENT DOCUMENTS 7,068,704 B1   6/2006  Orr
7,751,520 B1   7/2010  Zeng et al.
(Continued)

FOREIGN PATENT DOCUMENTS

WO   2003027703 A3   4/2003
WO   2015017268 A1   2/2015
(Continued)

OTHER PUBLICATIONS

3GPP TS 36.211 v8.4.0 (Sep. 2008), 3rd generation Partner Project; Technical Specification Group Radio Access Network; Evolved Universal Terrestrial Radio Access (E-Utra); physical channels and modulation (Release 8), Sep. 2008, 3GPP.
(Continued)

*Primary Examiner* — Asad M Nawaz
*Assistant Examiner* — Kai Chang
(74) *Attorney, Agent, or Firm* — Arent Fox, LLP

(57) ABSTRACT

A UE may be operating in a wireless communication network having a UE-centric medium access control layer, and the UE may detect presence of a trigger event to signal a base station of the wireless communication network. The UE may identify one of a plurality of functionalities corresponding to the trigger event, and may generate a chirp signal that includes chirp purpose indicator and a chirp message, wherein the chirp purpose indicator and a format of the chirp message correspond to the identified one of the plurality of functionalities. Accordingly, the UE may transmit the chirp signal having the chirp purpose indicator to the base station,
(Continued)

which may provide a chirp response message that includes message contents that relate to the chirp purpose indicator.

29 Claims, 9 Drawing Sheets

Related U.S. Application Data

(60) Provisional application No. 62/326,607, filed on Apr. 22, 2016.

(51) Int. Cl.
| | | |
|---|---|---|
| *H04H 20/38* | (2008.01) | |
| *H04W 28/02* | (2009.01) | |
| *H04W 74/08* | (2009.01) | |
| *H04W 88/02* | (2009.01) | |
| *H04W 88/08* | (2009.01) | |

(52) U.S. Cl.
CPC ....... *H04W 48/14* (2013.01); *H04W 74/0833* (2013.01); *H04Q 2213/13215* (2013.01); *H04W 88/02* (2013.01); *H04W 88/08* (2013.01); *Y02D 30/70* (2020.08)

(58) Field of Classification Search
CPC . H04W 74/0833; H04W 88/02; H04W 88/08; Y02D 70/1222; Y02D 70/1242; Y02D 70/1262; Y02D 70/1264; Y02D 70/142; Y02D 70/144; Y02D 70/146; Y02D 70/21; Y02D 70/26
See application file for complete search history.

(56) References Cited

U.S. PATENT DOCUMENTS

| | | | |
|---|---|---|---|
| 8,131,215 B2 | 3/2012 | Swope et al. | |
| 8,175,073 B1 | 5/2012 | Hui et al. | |
| 8,265,682 B2* | 9/2012 | Bertrand | H04W 52/0225 |
| | | | 455/522 |
| 8,718,117 B2 | 5/2014 | Hiscock | |
| 8,964,679 B2 | 2/2015 | Anderson et al. | |
| 8,971,379 B2 | 3/2015 | Hiscock | |
| 9,137,621 B2 | 9/2015 | McCann et al. | |
| 9,438,440 B2 | 9/2016 | Burns et al. | |
| 9,717,110 B1 | 7/2017 | Gupta et al. | |
| 2004/0022299 A1 | 2/2004 | Anglin | |
| 2008/0205314 A1 | 8/2008 | Pecen et al. | |
| 2008/0214193 A1 | 9/2008 | Jeong et al. | |
| 2010/0254337 A1 | 10/2010 | Lin et al. | |
| 2011/0164586 A1 | 7/2011 | Kim et al. | |
| 2011/0310822 A1 | 12/2011 | Nair et al. | |
| 2012/0063302 A1 | 3/2012 | Damnjanovic et al. | |
| 2012/0163305 A1* | 6/2012 | Nimbalker | H04W 52/0206 |
| | | | 370/329 |
| 2014/0112131 A1 | 4/2014 | Todaka et al. | |
| 2014/0126492 A1 | 5/2014 | Gleixner et al. | |
| 2014/0301330 A1 | 10/2014 | Lee et al. | |
| 2015/0222533 A1 | 8/2015 | Birrittella et al. | |
| 2015/0230263 A1* | 8/2015 | Roy | H04W 64/00 |
| | | | 455/452.2 |
| 2015/0382284 A1 | 12/2015 | Brismar et al. | |
| 2016/0057785 A1 | 2/2016 | Zhang et al. | |
| 2016/0080924 A1 | 3/2016 | Maaref et al. | |
| 2016/0127520 A1 | 5/2016 | Tewari et al. | |
| 2016/0338033 A1 | 11/2016 | Xiao et al. | |
| 2017/0111195 A1* | 4/2017 | Hammerschmidt | |
| | | | H04L 27/1563 |
| 2017/0150481 A1 | 5/2017 | Gupta et al. | |
| 2017/0231021 A1 | 8/2017 | Tavildar et al. | |
| 2017/0244460 A1 | 8/2017 | Li et al. | |
| 2017/0251460 A1 | 8/2017 | Agiwal et al. | |
| 2017/0251500 A1 | 8/2017 | Agiwal et al. | |
| 2017/0311254 A1 | 10/2017 | Ly et al. | |
| 2018/0063869 A1 | 3/2018 | Zhang et al. | |
| 2018/0070264 A1 | 3/2018 | Saiwai et al. | |

FOREIGN PATENT DOCUMENTS

| | | |
|---|---|---|
| WO | 2017139051 A1 | 8/2017 |
| WO | 2017139111 A1 | 8/2017 |

OTHER PUBLICATIONS

International Search Report and Written Opinion—PCT/US2017/023553—ISA/EPO—Jun. 12, 2017.
NEC: "LTE BCH-on-demand", R2-062930, TSG-RAN Working Group2#55, Oct. 5, 2006, XP002465836, Retrieved from the Internet: URL:http:/www.3gpp.org/ftp/tsg_ran/WG2_RL2/TSGR2_55/Documents/ [retrieved on Jan. 22, 2008], 5 pages.
Peng H., et al., "Ultra Dense Network: Challenges, Enabling Technologies and New Trends," China Communications, vol. 13, No. 2, Feb. 1, 2016, XP011599109, pp. 30-40, ISSN: 1673-5447, DOI: 10.1109/CC.2016.7405723,.
Qualcomm Technologies: "Making 5G NR a Reality", Dec. 2016, XP055360375, Retrieved from the Internet: URL: https://www.qualcomm.com/documents/whitepaper-making-5g-nr-reality [Retrieved on Mar. 30, 2017].
Smee J., "Qualcomm 5g Vision and Design", 5G Vision and Design IEEE 5G Summit Silicon Valley, Nov. 16, 2015 (Nov. 16, 2015), XP055360363, 22 pages.
Wunder G., et al., "5GNOW: Non-Orthogonal, Asynchronous Waveforms for Future Mobile Applications", IEEE Communications Magazine, IEEE Service Center, Piscataway, US, vol. 52, No. 2, Feb. 12, 2014 (Feb. 12, 2014), pp. 97-105, XP011539680, ISSN: 0163-6804, DOI: 10.1109/MCOM.2014.6736749 [retrieved on Feb. 10, 2014] p. 99-p. 100; figure 2.

* cited by examiner

CHIRP SIGNAL FORMATS AND TECHNIQUES

CLAIM OF PRIORITY UNDER 35 U.S.C. § 119

This application is a Continuation of application Ser No. 15/289,651 entitled "CHIRP SIGNAL FORMATS AND TECHNIQUES," filed Oct. 10, 2016, which claims priority to Provisional Application No. 62/326,607, entitled "CHIRP SIGNAL FORMATS AND TECHNIQUES" filed Apr. 22, 2016, which are assigned to the assignee hereof and hereby expressly incorporated by reference herein for all purposes.

BACKGROUND

Aspects of the present disclosure relate generally to wireless communication networks, and more particularly, to chirp signal formats and techniques in a wireless communication network.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

For example, for 5G communications technology and beyond, current network-centric media access control (MAC) layer technologies may not provide a desired level of resource utilization and/or efficiency because of the various associated signal broadcasts. For instance, these broadcasts consume power and may or may not be received or used by some or all of a cell's served user equipments (UEs). Thus, improvements in wireless communication network operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes a wireless communication network having a user equipment (UE)-centric medium access control (MAC) layer. A wireless communication network having a UE-centric MAC layer may enable both UEs and base stations to conserve power, among additional aspects and features as discussed in detail below. As further discussed below, UE-centric MAC features can enable and provide an edgeless network arrangement that can be useful in internet of everything (TOE) applications.

In an aspect, a method of a UE to signal a network entity is provided. The method includes detecting, by the UE operating in a wireless communication network having a UE-centric medium access control layer, presence of a trigger event to signal a base station of the wireless communication network. The method also includes identifying one of a plurality of functionalities corresponding to the trigger event, generating a chirp signal having a chirp purpose indicator and a chirp message, where the chirp purpose indicator and a format of the chirp message correspond to the identified one of the plurality of functionalities, and transmitting the chirp signal having the chirp purpose indicator to the base station.

In another aspect, an apparatus configured to signal a network entity is provided. The apparatus includes a transceiver having a receiving and a transmitter respectively for receiving and transmitting wireless signals in a wireless communication network having a UE-centric medium access control layer, a memory having one or more instructions, and a processor in communication with the memory and the transceiver. The processor is configured to detect presence of a trigger event to signal a base station of the wireless communication network, identify one of a plurality of functionalities corresponding to the trigger event, generate a chirp signal having a chirp purpose indicator and a chirp message, where the chirp purpose indicator and a format of the chirp message correspond to the identified one of the plurality of functionalities, and transmit, via the transceiver, the chirp signal having the chirp purpose indicator to the base station.

In another aspect, an apparatus to signal a network entity is provided. The apparatus includes means for detecting, by the UE operating in a wireless communication network having a UE-centric medium access control layer, presence of a trigger event to signal a base station of the wireless communication network. The apparatus also includes means for identifying one of a plurality of functionalities corresponding to the trigger event, means for generating a chirp signal having a chirp purpose indicator and a chirp message, where the chirp purpose indicator and a format of the chirp message correspond to the identified one of the plurality of functionalities, and means for transmitting the chirp signal having the chirp purpose indicator to the base station.

In another aspect, a computer-readable medium including code executable to signal a network entity is provided. The code includes code for detecting, by the UE operating in a wireless communication network having a UE-centric medium access control layer, presence of a trigger event to signal a base station of the wireless communication network. The code also includes code for identifying one of a plurality of functionalities corresponding to the trigger event, code for generating a chirp signal having a chirp purpose indicator and a chirp message, where the chirp purpose indicator and a format of the chirp message correspond to the identified one of the plurality of functionalities, and code for transmitting the chirp signal having the chirp purpose indicator to the base station.

In another aspect, a method of operating a base station to communicate with a user equipment is provided. The method includes receiving, at the base station operating in a wireless communication network having a UE-centric medium access control layer, a chirp signal, having a chirp purpose indicator and a fixed size chirp message, from the user equipment, identifying one of a plurality of functionalities based at least in part on the chirp purpose indicator, determining a format of the fixed size chirp message based at least in part on the chirp purpose indicator, and determining one or more parameters in the fixed size chirp message based at least in part on the format of the fixed size chirp message. The method also includes generating a chirp response message that includes message contents that relate to the one or more parameters or the identified one of the plurality of functionalities, and transmitting the chirp response message to the user equipment in response to the chirp signal.

In another aspect, an apparatus to communicate with a user equipment is provided. The apparatus includes a transceiver configured to receive a chirp signal, having a chirp purpose indicator and a chirp message, from the user equipment, where the chirp purpose indicator corresponds to one of a plurality of functionalities, where the transceiver is operating in a wireless communication network having a UE-centric medium access control layer. The apparatus also includes a memory having one or more instructions, and a processor in communication with the memory and the transceiver. The processor is configured to identify one of a plurality of functionalities based at least in part on the chirp purpose indicator, determine a format of the fixed size chirp message based at least in part on the chirp purpose indicator, determine one or more parameters in the fixed size chirp message based at least in part on the format of the fixed size chirp message, and generate a chirp response message that includes message contents that relate to the one or more parameters or the identified one of the plurality of functionalities. In addition, the transceiver is configured to transmit the chirp response message to the user equipment in response to the chirp signal.

In another aspect, an apparatus to communicate with a user equipment is provided. The apparatus includes means for receiving, at the base station operating in a wireless communication network having a UE-centric medium access control layer, a chirp signal, having a chirp purpose indicator and a fixed size chirp message, from the user equipment, means for identifying one of a plurality of functionalities based at least in part on the chirp purpose indicator, means for determining a format of the fixed size chirp message based at least in part on the chirp purpose indicator, and means for determining one or more parameters in the fixed size chirp message based at least in part on the format of the fixed size chirp message. The method also includes means for generating a chirp response message that includes message contents that relate to the one or more parameters or the identified one of the plurality of functionalities, and means for transmitting the chirp response message to the user equipment in response to the chirp signal.

In another aspect, a computer-readable medium including code executable to communicate with a user equipment is provided. The code includes code for receiving, at the base station operating in a wireless communication network having a UE-centric medium access control layer, a chirp signal, having a chirp purpose indicator and a fixed size chirp message, from the user equipment, code for identifying one of a plurality of functionalities based at least in part on the chirp purpose indicator, code for determining a format of the fixed size chirp message based at least in part on the chirp purpose indicator, and code for determining one or more parameters in the fixed size chirp message based at least in part on the format of the fixed size chirp message. The code also includes code for generating a chirp response message that includes message contents that relate to the one or more parameters or the identified one of the plurality of functionalities, and code for transmitting the chirp response message to the user equipment in response to the chirp signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
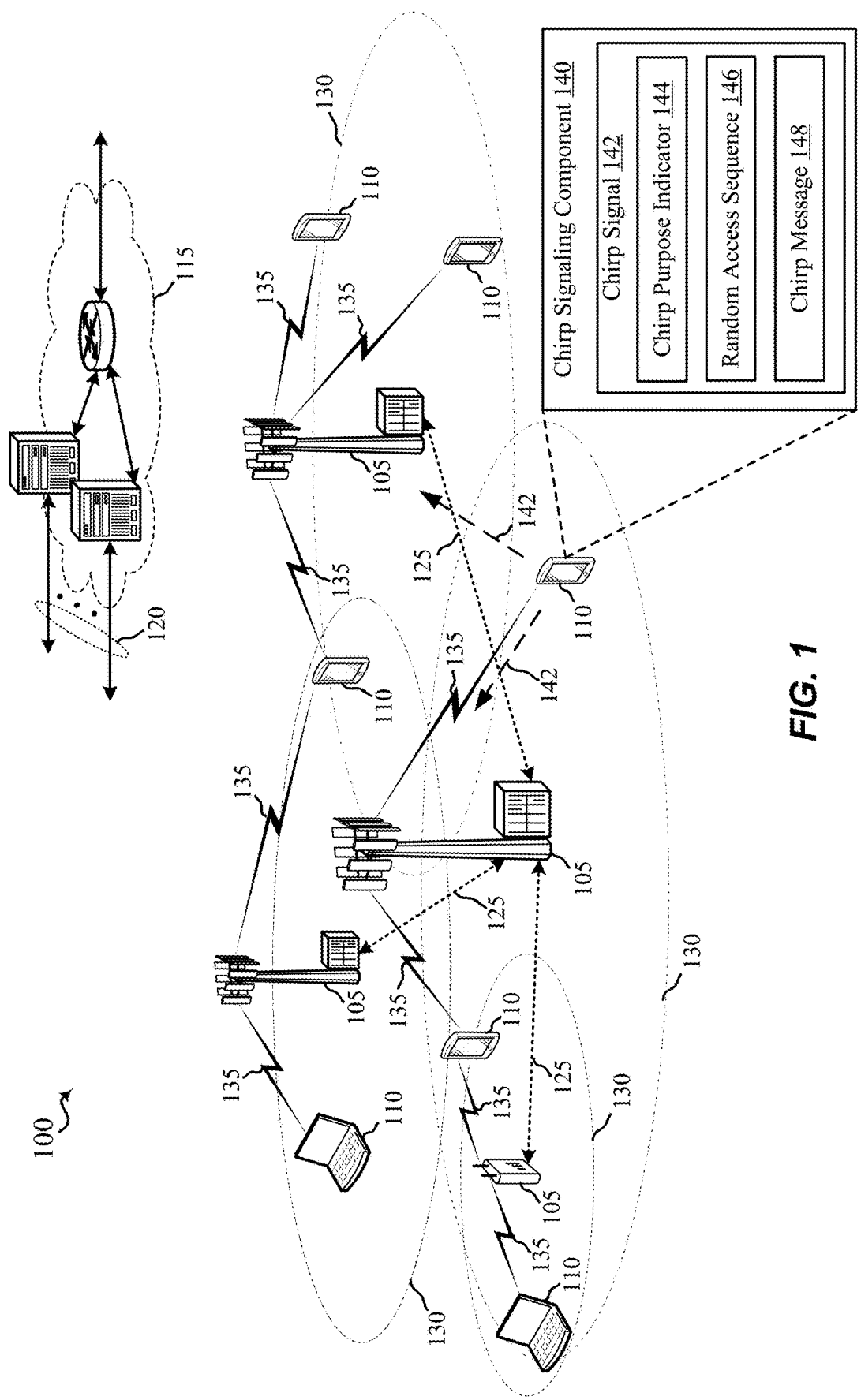
FIG. 1 is a schematic diagram of a wireless communication network including at least one user equipment (UE) having a chirp signaling component configured to transmit, according to one aspect, a chirp signal including a chirp purpose indicator along with a random access sequence and a chirp message.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The described features generally relate to a wireless communication network having a user equipment (UE)-centric media access control (MAC) layer. For example, a wireless communication network having a UE-centric MAC layer may be advantageous, in some respects, in a time-domain duplex (TDD) system having a large antenna array, as the large antenna array may have limited coverage for broadcast channels (e.g., the channels that broadcast synchronization signals and system information in a wireless communication network having a network-centric MAC layer). As described in the present disclosure, a wireless communication network having a network-centric MAC layer may forego the broadcast of system information, as well as some cell-specific synchronization signals. A wireless communication network having a UE-centric MAC layer may also be advantageous, in some respects, in that mobility measurements can contribute to UE power consumption, and a wireless communication network having a UE-centric MAC layer can offload many mobility measurements previously performed by UEs to the network. A wireless communication network having a UE-centric MAC layer may also offload handover and cell reselection processing and decisions to the network, which, when otherwise performed by a UE in a network-centric wireless communication network can be a major source of jitter and call drops. A wireless communication network having a UE-centric MAC layer may also be advantageous, in some respects, because the broadcast of system information and cell-specific information by a base station can contribute significantly to the power consumption of the base station, use of radio resources by the base station, etc. As previously indicated, a base station in a wireless communication network having a UE-centric MAC layer may often forego the broadcast of system information or cell-specific information (or at least forego scheduled broadcast of system information in favor of transmitting system information upon request).

In UE-centric MAC layer configurations, for example, a UE may transmit a signal, which may be based on detecting one or more broadcast signals related to synchronizing communications with the wireless communication network. This signal transmitted by the UE to contact the wireless communication network may be referred to herein as a chirp signal. In an example, the UE may transmit the chirp signal for one or more purposes, such as to request information or services. As such, a chirp signal may be associated with more than one purpose or functionality. For example, the UE may transmit a chirp signal to request system information (e.g., to establish a communication with the network), to initiate a random access procedure when the UE has data to transmit to the network, to support mobility tracking or handover when the UE is moving through the network, etc. The chirp signal may contain a random access sequence to avoid collisions with other chirp signals from other UEs. The chirp signal may additionally or alternatively include a chirp message. In some cases, the chirp message could be scrambled by random access sequence. Thus, the chirp signal might have different functionalities or purposes depending on its usage.

As such, according to the present aspects, a UE may be configured to generate a chirp signal to include a chirp purpose indicator to identify a purpose or functionality of the chirp signal. For example, the chirp purpose indicator may identify the chirp signal as relating to a specific one of requesting system information, initiating random access procedure, supporting mobility tracking, initiating handover, etc. Providing a chirp purpose indicator in chirp signal may be more efficient for a receiving entity, e.g., one or more base stations. For example, in an aspect, the base stations may read the chirp purpose indicator in order to correctly extract information in the chirp signal and/or the chirp message, e.g., the chirp purpose indicator allows the base station to know or determine the format and content of the given chirp signal. Furthermore, the chirp purpose indicator may allow a base station to begin initiating or reserving resources for preparing a response to the chirp signal.

Other aspects of the present disclosure relate to defining different sets of content for different chirp messages corresponding to different chirp purposes or functionalities as signaled by the chirp purpose indicator. Further, in some cases, the different chirp messages may have a same or different size or length, and some of the different chirp messages may have the same or similar fields, which also may be of the same or different sizes or lengths across different chirp messages. For example, chirp signals having consistently sized overall length and consistently sized field lengths may improve efficiencies of both the UE and the base station by standardizing the size. In another example, dynamically sized overall length and dynamically sized field lengths may allow both the UE and the base station more flexibility (as compared to fix sizes) in providing a customized amount of data.

Moreover, the different formats of the chirp signal and/or chirp message and/or random access sequence, including the chirp purpose indicator, may be used in different modes of operation or states of the UE. For example, in 5G, at least three states may be defined for a UE: radio resource control (RRC)-idle, such as when the UE is first powered up; RRC-common (also referred to as RRC-inactive), such as when the UE has camped on a cell of a base station but is inactive and periodically wakes up to monitor for paging signals from the base station; and, RRC-dedicated (also referred to as RRC-connected or RRC-connected-active), such as when the UE has established one or more dedicated communication channels with the cell of the base station such that the UE may be transmitting or receiving data. The formats of the chirp signal disclosed herein could be applicable to any of these states. For instance, in the RRC-common state, the formats of the chirp signal disclosed herein may be used to request system information, to initiate a random access procedure, to support mobility tracking, etc. Also, the formats of the chirp signal discussed herein may also be applicable to RRC-dedicated state, such as when the UE performs handover to a new zone, which may be a plurality of cells operating on the same frequency and with the same timing, etc. In this case, a handover from one cell to another is controlled by the network and transparent to the UE.

Additional features of the present aspects are described in more detail below with respect to FIGS. 1-10.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 having a chirp signaling component 140 configured to generate and cause transmission of a chirp signal 142 that includes, at least, chirp purpose indicator 144 having data to inform the network (e.g., at least one base station 105) about a purpose, functionality, and/or requested service associated with chirp signal 142.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G, fourth generation (4G)/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

As mentioned above, in accordance with the present disclosure, in an implementation of the wireless communication network 100 having a UE-centric MAC layer, UE 110 operating chirp signaling component 140 may be configured to transmit chirp signal 142 that includes chirp purpose indicator 144 in addition to the other contents of chirp signal 142, such as a random access sequence 146 and a chirp message 148. Though generally shown as including the random access sequence 146 followed by the chirp message 148, persons skilled in the art will appreciate that in some examples the chirp signal 142 may include some or all of the chirp message 148 before the random access sequence 146 or have the random access sequence 146 in substantially any location within the chirp message 148.

Random access sequence 146 may include, but is not limited to, one of a plurality of sets of specific bit patterns or signatures that can be used to differentiate requests coming from different UEs. Chirp message 148 may include, but is not limited to, one or more of: a set of bits associated with a purpose or function of chirp signal 142, such as, but not limited to, an amount of data waiting for transmission reported in association with initiating a random access procedure; global zone identifier (ID) group information (e.g., an identifier of a set of cells organized into a zone that each operate on a same frequency, timing, etc., to allow network-controlled handover without UE involvement); other mobility-related or handover-related information for supporting mobility tracking or handover; an identification of one or more SIBs for requesting system information; etc. Optionally, chirp message 148 may additionally include a set of bits that represent an identity of UE 110.

Chirp purpose indicator 144 may be a set of specially-formatted data to give a receiving network entity, such as base station 105, an indication as to why UE 110 is sending chirp signal 142, e.g., an early indication as to the purpose or function associated with chirp message 148. In other words, chirp purpose indicator 144 is different from, and may have a smaller size than, chirp message 148. Moreover, as noted above, chirp purpose indicator 144 may enable a more efficient operation of base station 105, as it may allow base station 105 to know or determine the format and content of the received chirp signal 142 (which may vary depending on the chirp purpose), and/or as it may allow base station 105 to reserve resources and/or initiate a response to chirp signal 142 prior to decoding and reading the entire contents of chirp signal 142.

Chirp signaling component 140 may be a specially-configured processor, computer-executable code or instructions stored on a computer-readable medium (e.g., a memory) and executable by a processor, or any combination thereof, to perform the functions described herein. UE 110 may operate chirp signaling component 140 to broadcast chirp signal 142, or to transmit chirp signal 142 over a dedicated channel of wireless communication link 135, such as via a transceiver or transmitter. Since UE 110 may operate chirp signaling component 140 to transmit chirp signal 142, e.g., to initiate a random access procedure, or to support mobility tracking or handover, or to request system information, the content of chirp message 148 may vary depending on the corresponding purpose or function. Accordingly, the inclusion of chirp purpose indicator 144 provides a mechanism for UE 110 to inform a receiving base station 105 about the purpose or function of chirp signal 142.

In some aspects, the inclusion of chirp purpose indicator 144 in chirp signal 142 may improve an efficiency of base station 105 in processing chirp signal 142. For instance, in some cases, chirp purpose indicator 144 may be decoded by base station 105 prior to decoding other contents (e.g., chirp message 148) of chirp signal 142, which can allow base station 105 to narrow down subsequent processing options for the chirp signal 142, and/or in generating an associated response, and thus reduce the usage of processing resources.

Figure 2:
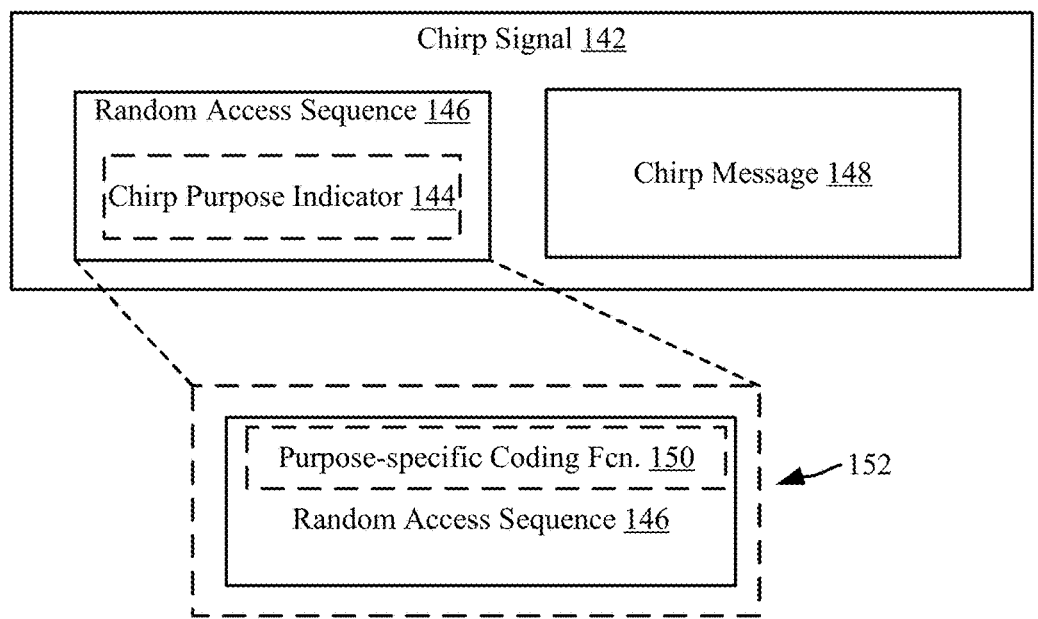
FIG. 2 is a schematic diagram of an aspect of a chirp signal having a chirp message and a random access sequence including the chirp purpose indicator, and a corresponding example implementation of the same.
Figure 3:
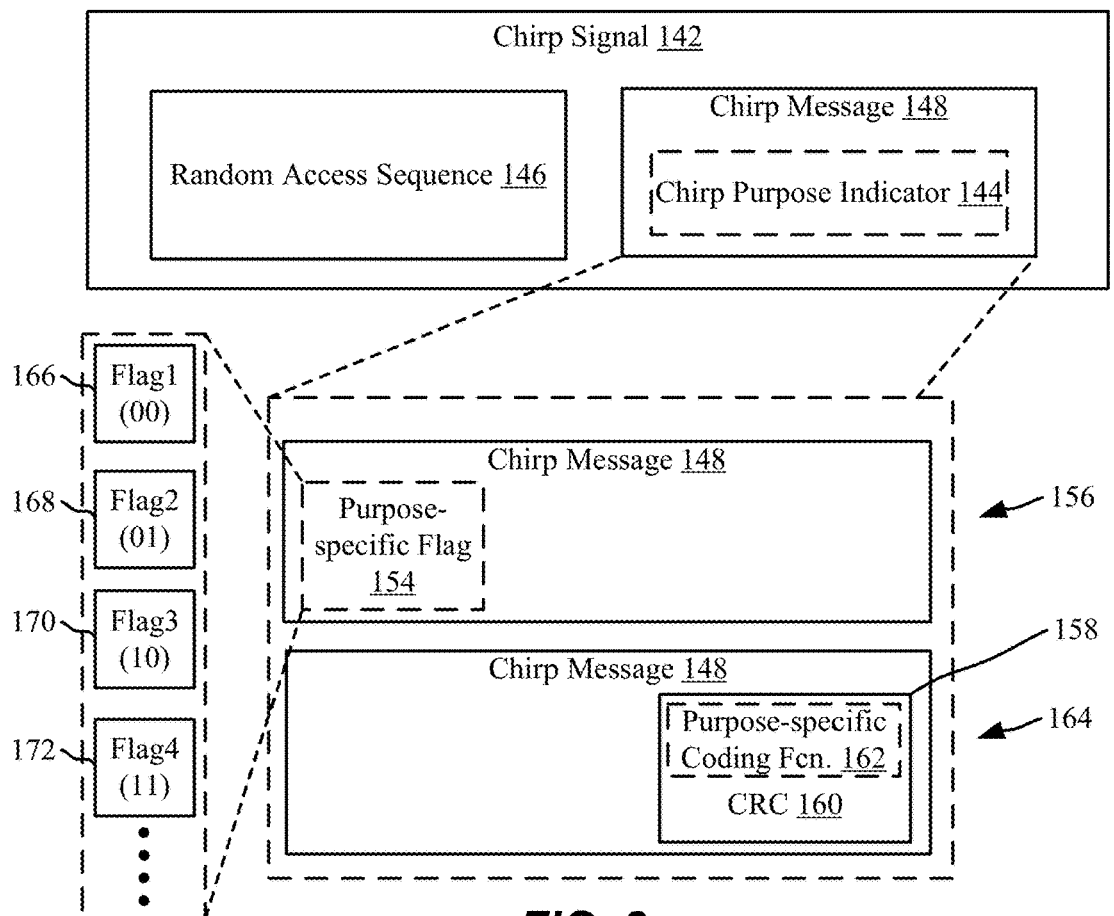
FIG. 3 is a schematic diagram of an aspect of a chirp signal having a random access sequence and a chirp message including the chirp purpose indicator, and corresponding example implementations of the same.
Figure 4:
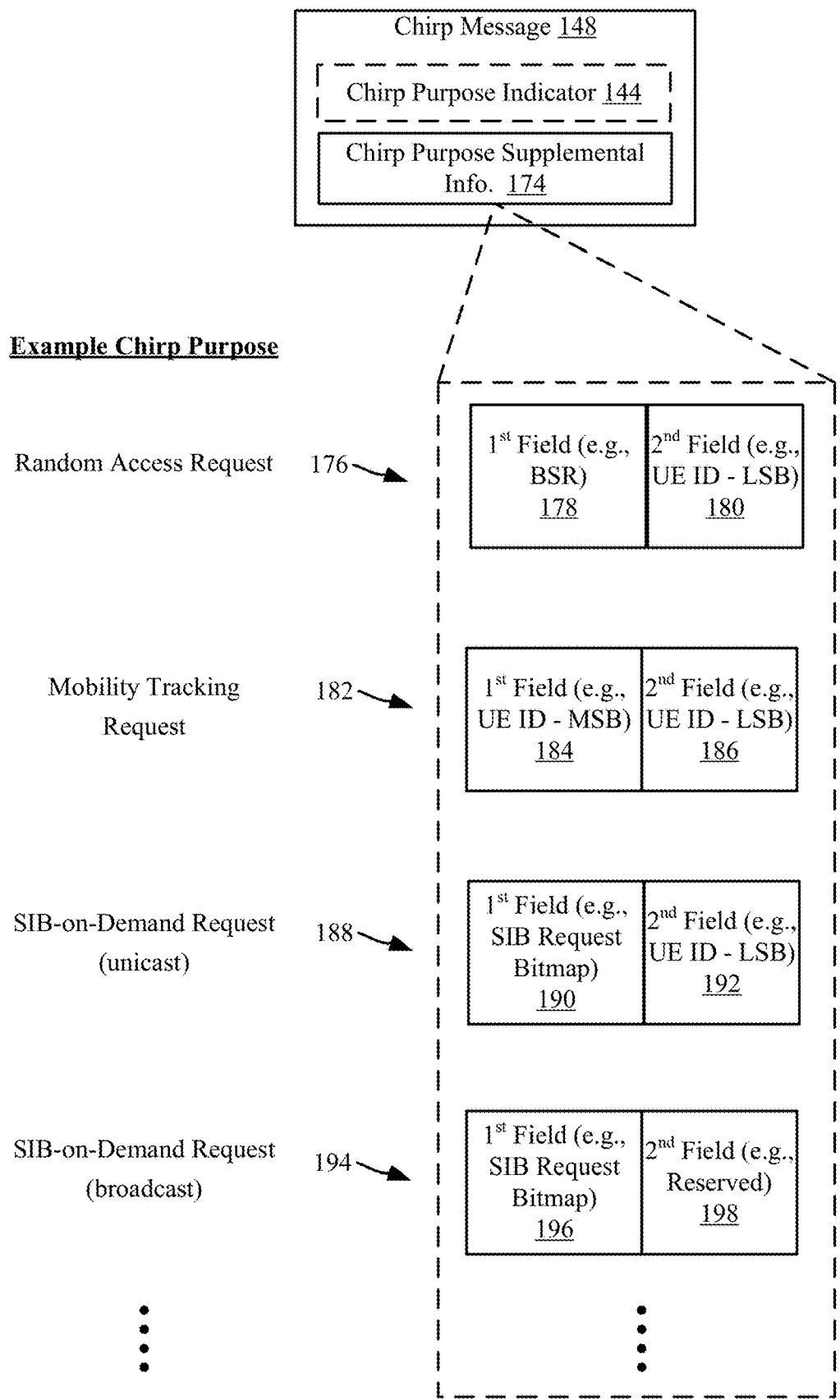
FIG. 4 is a schematic diagram of an aspect of a chirp message including the chirp purpose indicator and chirp supplemental information, and corresponding example implementations of different formats of the same.

Referring to FIGS. 2-4, UE 110 executing chirp signaling component 140 may utilize any one of a number of different formats for generating chirp signal 142, chirp purpose indicator 144, random access sequence 146, and/or chirp message 148.

Referring specifically to examples in FIGS. 2 and 3, as opposed to being generally included within chirp signal 142 as illustrated in the example of FIG. 1, chirp purpose indicator 144 may in some cases be generated as a part of or accompanying random access sequence 146 as in FIG. 2, or in other cases be generated as part of or accompanying chirp message 148 as in FIG. 3.

In FIG. 2, for instance, in one example that should not be construed as limiting, chirp purpose indicator 144 may be generated as a part of random access sequence 146 by encoding random access sequence 146 with a purpose-specific coding function 150 to generate encoded random access sequence 152. In an aspect, purpose-specific coding function 150 may vary in a manner that may be known to, or determinable by, both UE 110 and base station 105 and in a manner that may be dependent upon the corresponding chirp purpose indicator 144. Purpose-specific coding function 150 may include, but is not limited to, a type of scrambling code, coding scheme, function, encryption algorithm, etc., that may be reversibly applied to random access sequence 146, and that may be known, or otherwise determinable by (e.g., based on a stored or received configuration), both UE 110 and base station 105. In other words, purpose-specific coding function 150 can include a purpose-specific encoding function and a corresponding purpose-specific decoding function. As such, applying the purpose-specific encoding function portion of purpose-specific coding function 150 to random access sequence 146 can result in encoded random access sequence 152, and applying the purpose-specific decoding function portion of purpose-specific coding function 150 to random access sequence 146 can result in decoding encoded random access sequence 152 and hence results in the original random access sequence 146.

In an aspect, UE 110 may select random access sequence 146 from among a plurality of random access sequences known to, or determinable by, both UE 110 and base station 105, where different sets of the plurality of random access sequences may be grouped to correspond to different chirp purposes (e.g., a first set associated with initiating a random access procedure, a second set associated with supporting mobility tracking or handover, a third set associated with requesting system information, etc.). Alternatively, or in addition, each of the plurality of random access sequences may have a corresponding random access sequence index value, which can be used to vary purpose-specific coding function 150 in a manner that can be correlated to the chirp purpose. For instance, in example that should not be construed as limiting, purpose-specific coding function 150 may include a scrambling sequence, and the random access sequence index value may be used to seed the scrambling sequence to obtain a seeded scrambling sequence, which may be known to both UE 110 and base station 105. As such, when base station 105 receives encoded random access sequence 152 and decodes it using a known seeded scrambling sequence to obtain a known random access sequence 146, then base station 105 can correlate the respective known random access sequence 146 to a respective chirp purpose based on the known grouping with which the known random access sequence 146 corresponds. Thus, random access sequence 146 encoded by a respective purpose-specific coding function 150 may be utilized to indicate a purpose of chirp signal 142. For example, UE 110 and/or base station 105 may store (e.g., in an associated memory) a configuration including a plurality of possible random access sequences, indices, etc. and associated chirp purposes (e.g., in a mapping) such as to determine a random access sequence, index, etc. for an intended chirp purpose and/or vice versa. In one example, base station 105 may configure UE 110 with the configuration (e.g., mapping) and/or vice versa.

In FIG. 3, using examples that should not be construed as limiting, chirp purpose indicator 144 may be generated as a part of chirp message 148. For example, in an aspect, chirp message 148 may include a purpose-specific flag 154 to define a purpose-specific flagged chirp message 156. Also, in another example, a purpose-specific encoded cyclic redundancy check (CRC) message 158 (e.g., a CRC 160 selected based on a purpose-specific coding function 162) may be added to chirp message 148 to define a purpose-specific encoded CRC chirp message 164.

In an aspect, purpose-specific flag 154 may be, but is not limited to, a field containing one or more bits, where different values of the one or more bits correspond to different chirp purposes (e.g., to initiate a random access procedure, to support mobility tracking, to request system information, etc.), as is known, or determinable, by both UE 110 and base station 105 (e.g., based on a stored configuration/mapping between bits of the flag and corresponding chirp purposes, a function for determining a chirp purpose based on bits of the flag, etc.). As such, upon receiving purpose-specific flagged chirp message 156 and decoding purpose-specific flag 154, base station 105 may correlate the value of purpose-specific flag 154 with a respective chirp purpose.

For instance, in one example that should not be construed as limiting, purpose-specific flag 154 may be a two bit field. In a case where the chirp purpose may include one of initiating a random access procedure, supporting mobility tracking, requesting system information (e.g., including a request associated with a unicast response or a broadcast response), there may be 4 different flag values (Flag1 166, Flag2 168, Flag 3 170, and Flag4 172). A non-limiting example of the values of purpose-specific flag 154 and the chirp purposes may be as follows:

TABLE 1

Example Purpose-specific Flag values for different Chirp Purposes

| Chirp Purpose | Example Bits Values of Purpose-specific Flag 154 |
|---|---|
| Random access | <0, 0> 166 |
| Mobility tracking | <0, 1> 168 |
| System Information request (associated with a unicast response) | <1, 0> 170 |
| System Information request (associated with a broadcast response) | <1, 1> 172 |

As noted above, UE 110 may send chirp signal 142 to request system information, and in some cases the chirp signal 142 may be formatted such that the response from base station 105 is sent back to UE 110 via a unicast channel, whereas in other cases the response from base station 105 is sent back to UE 110 via a broadcast channel, e.g., when more than one UE requests the same or similar system information. More details about these formats are discussed below.

In an aspect, purpose-specific coding function 162 may include, but is not limited to, a type of scrambling code, coding scheme, function, encryption algorithm, etc., that may be reversibly applied to determine a CRC 160, and that is known, or determinable, by both UE 110 and base station 105 (e.g., based on a configuration, mapping, function, etc. stored in a corresponding memory). In an aspect, purpose-specific coding function 162 applied to determine CRC 160 may be different from purpose-specific coding function 150 applied to determine random access sequence 146, although in other aspect they may be the same function.

For example, in an aspect of generating purpose-specific encoded CRC message 158, where purpose-specific coding function 162 includes a chirp CRC masking code, let $a_0, a_1, a_2, a_3, \ldots, a_{A-1}$ be chirp message 148 and $P_0, P_1, P_2, P_3, \ldots, P_{L-1}$ be the bits of CRC 160 (e.g., 16 bits), which are computed and attached to the chirp message 148. After the attachment, the bits of CRC 160 are scrambled according to the chirp functionality with the sequence $x_0, x_1, \ldots, x_{15}$ as indicated in the below Table 2 to form the sequence of bits $c_0, c_1, c_3, \ldots, c_{K-1}$ where $$c_k = a_k \text{ for } k=0,1,2,\ldots,A-1$$

where A is a length (e.g., in bits, from bit 0 to bit A−1, as noted above)) of the chirp message 148, and where k is the bit index in the chirp message.

$$c_k = (p_{k-A} + x_{k-A}) \bmod 2 \text{ for } k=A,A+1,A+2,\ldots,A+L-1$$

where L is a length (e.g., in bits, from bit 0 to bit L−1, as noted below) of the chirp CRC masking code (see Table 2).

TABLE 2

Example CRC mask for chirp message

| Chirp Purpose | Example Chirp CRC mask $<x_0, x_1, \ldots, x_{L-1}>$ |
|---|---|
| Random access | <0, 0, 0, 0, 0, 0, 0, 0, 0, 0, 0, 0, . . . , 0> |
| Mobility Tracking | <1, 1, 1, 1, 1, 1, 1, 1, 1, 1, 1, 1, . . . , 1> |
| System Information request | <0, 1, 0, 1, 0, 1, 0, 1, 0, 1, 0, 1, . . . , 0, 1> |

In other words, according to the above formula, chirp message 148 is not encoded and CRC 160 is encoded by the chirp CRC mask. As a result, purpose-specific encoded CRC chirp message 164, or $c_k$, may be represented as:

$$c_k = c_0 \ldots c_{A-1} \cdot c_A \ldots c_{A+L-1}$$

where $c_0$ through $c_A$ represents the original value of chirp message 148 (e.g., the encoding does not change the original chirp message), and where $c_A$ through $C_{A+L-1}$ represents purpose-specific encoded CRC message 158 (e.g., the encoding modifies the CRC in order to provide the indication as to the purpose or function of chirp signal 142).

As such, upon receiving purpose-specific encoded CRC chirp message 164 and decoding it with a respective purpose-specific coding function 162, such as a respective one of the chirp CRC masks in Table 2, base station 105 may correlate the respective purpose-specific coding function 162 with a respective chirp purpose.

Referring to FIG. 4, chirp message 148 may have any one of a plurality of different contents, which may depend on the mechanism used to include chirp purpose indicator 144 (e.g., via inclusion as a flag, with random access sequence 146 or chirp message 148, etc. as described at a high level in above with respect to FIG. 3), and/or the chirp purpose. In particular, in an aspect, chirp message 148 may include different types of chirp purpose supplemental information 174, which may include different types of data in one or more data fields, which may include similar and/or different data fields depending on the chirp purpose. In an example, chirp message 148 may be of a fixed size for the different chirp purposes (e.g., but may include different formats having a different number of, and/or different sized, fields for different chirp purposes).

For example, in the case of the chirp purpose being related to a "random access request," chirp purpose supplemental information 174 may have a first format 176 that includes a first field 178 containing data relevant to random access, and a second field 180 containing data related to identifying the requesting UE. For instance, in one example, first field 178 containing data relevant to random access may include, but is not limited to a buffer status report (BSR) to identify an amount of data that UE 110 has in a transmit buffer waiting to transmit, which may be relevant to base station 105 in determining what uplink resources to grant to UE 110 (e.g., in determining an amount of uplink resources, a position of the uplink resources over frequency or time, etc.).

Also, for instance, second field 180 containing data related to identifying the requesting UE, may include but is not limited to all or some portion of a UE identifier (ID). The UE ID may include a unique or substantially-unique identifier of UE 110 (either globally or with respect to base station 105 or some portion of wireless communication network 100), such as but not limited to: a random access radio network temporary identity (RA-RNTI), which may be determined from a time slot number in which the preamble is sent; an international mobile subscriber identity (IMSI); a mobile equipment identifier (MEID), or an international mobile equipment identifier (IMEI), which are globally unique numbers identifying a physical piece of mobile station equipment (MED typically given to CDMA devices; IMEI typically given to GSM devices); a cell radio network temporary identifier (C-RNTI); a globally unique temporary identifier (GUTI); an Internet Protocol address (IP address; such as an IPv4, IPv6, or Dual Stack IP address); etc. For instance, if the length of the first field 178 achieves a threshold with respect to a total size of the format 176, then second field 180 may include a set of least significant bits (LSB) or most significant bits (MSB) of the UE ID. For example, first field 178 and second field 180, and their relative position within chirp message 148, are one non-limiting example of the one of more fields that may be included in the first format 176 of chirp purpose supplemental information 174.

In another example, in the case of the chirp purpose being related to "mobility tracking request" or to "handover," chirp purpose supplemental information 174 may have a second format 182 that includes a first field 184 containing data relevant to mobility tracking, and a second field 186 containing data related to identifying the requesting UE. For instance, in one example, first field 184 containing data relevant to mobility tracking may include, but is not limited to a portion of a UE ID, which may be in addition to a different portion of the UE ID provided in second field 186. For instance, the UE ID may be an identifier as described above, and in this example, first field 184 may contain the UE ID MSB, while second field 186 may contain UE ID LSB. By providing both the MSB and LSB of the UE ID, the access node controller of target zones might know UE information and associated serving zone, which allow the target zones to request a UE context from the serving zone. This helps the inter-zone handover procedure be more efficient. For example, first field 184 and second field 186, and their relative position within chirp message 148, are one non-limiting example of the one of more fields that may be included in the second format 182 of chirp purpose supplemental information 174.

In a further example, in the case of the chirp purpose being related to a "system information request" (also referred to as a "SIB-on-Demand request") associated with a unicast response from base station 105, chirp purpose supplemental information 174 may have a third format 188 that includes a first field 190 containing data relevant to the particular SIBs being requested by UE 110, and a second field 192 containing data related to identifying the requesting UE 110. For instance, in one example, first field 190 containing data relevant to the particular SIBs being requested may include, but is not limited to, an identifier of one or more SIBs that UE 110 would like base station 105 to provide to UE 110.

Figure 5:
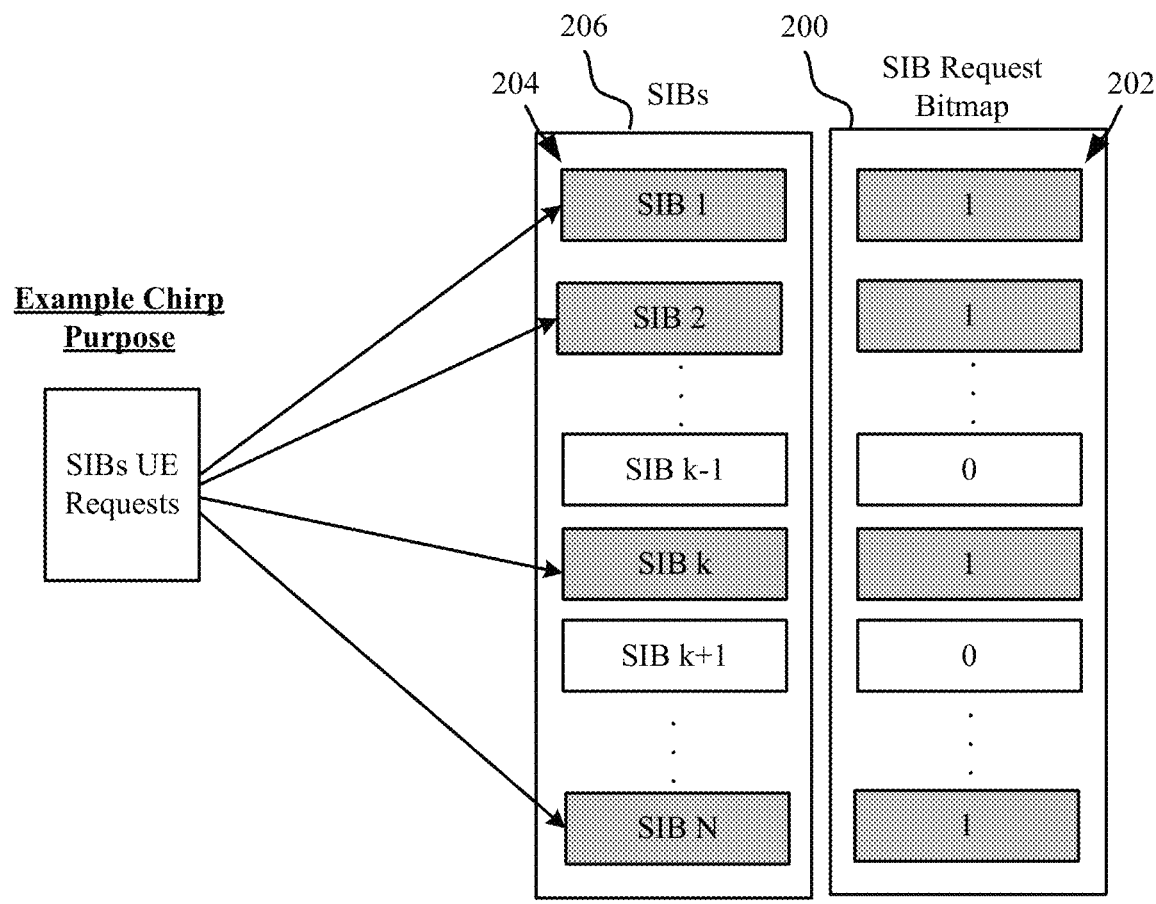
FIG. 5 is a schematic diagram of an aspect of a system information block (SIB) bitmap that may be included in some aspects of the chirp message, wherein the SIB bitmap includes values indicating whether or not a corresponding SIB is being requested.

For example, referring to FIG. 5, in one example use case that should not be construed as limiting, first field 190 including one or more SIB identifiers may be a SIB request bitmap 200 having a set of bits 202 with respective values that indicate whether a corresponding SIB 204 from a set of available SIBs 206 is being requested by UE 110. For instance, in this example, a position of each bit in SIB request bitmap 200 corresponds to one of the plurality of SIBs 204 in the set of available SIBs 206, e.g., a bit in first position may correspond to a first SIB, a bit in a second position may correspond to a second SIB, etc. Further, in this example, a bit value of "1" may indicate a request by UE 110 for base station 105 to provide the corresponding SIB information, whereas a value of "0" may indicate that the corresponding SIB information is not being requested. In other words, in a specific example where the SIB information can have 13 possible SIBs in the set of available SIBs 206, UE 110 can set the first and second bits in the SIB request bitmap 200 to have a value of "1" and bits 3 through 13 to have a value of "0" to request SIB1 and SIB2, which correspond to the first and second bits out of 13 bits in SIB request bitmap 200. In the example of FIG. 5, the number N is the total number of available SIBs 204, which may be any positive integer value, and k is a particular SIB within the N SIBs. In an example, SIB request bitmap 200 is one example of content that may be included in a field of third format 188 of chirp purpose supplemental information 174 related to a "SIB-on-Demand request" associated with a unicast response.

Referring back to FIG. 4 and third format 188 of chirp purpose supplemental information 174 being related to a "system information request" or "SIB-on-Demand request" associated with a unicast response, second field 192 containing data related to identifying the requesting UE, may include but is not limited to all or some portion of a UE identifier (ID), as described above, such as but not limited to a UE-ID LSB. For example, first field 190 and second field 192, and their relative position within chirp message 148, are one non-limiting example of the one of more fields that may be included in the third format 188 of chirp purpose supplemental information 174.

Additionally, in another example, in the case of the chirp purpose being related to a "SIB-on-Demand request" associated with a broadcast response from base station 105, chirp purpose supplemental information 174 may have a fourth format 194 that includes a first field 196 containing data relevant to the particular SIB s being requested by UE 110, and a second field 198 that may include any other relevant information or that may be a null or blank field. For instance, in one example, first field 196 containing data relevant to the particular SIBs being requested may include, but is not limited to, an identifier of one or more SIBs that UE 110 would like base station 105 to provide to UE 110, such as SIB request bitmap 200 (FIG. 5) as discussed above. In this case, second field 198 may be left blank, as compared to the unicast response example, because base station 105 does not need to identify UE 110 requesting the SIB information as no unicast link is necessary and the requested information can be broadcast for reception by any UEs in the coverage area of base station 105 (e.g., including UE 110). For example, the SIB information broadcast in response to this "SIB-on-Demand request" may be available to any UEs receiving the broadcast, or may be encoded (e.g., with the SIB request bitmap 200) such that only UEs requesting the broadcasted SIB information may decode the broadcast SIB information. This may save some processing resources on non-requesting UEs in the coverage area of the respective base station 105, as well as processing resources on the base station 105, communication resources, etc. by the base station 105 not transmitting SIB information separately to each UE. For example, first field 196 and second field 198, and their relative position within chirp message 148, are one non-limiting example of the one of more fields that may be included in the fourth format 194 of chirp purpose supplemental information 174.

Also, chirp message 148 including chirp purpose supplemental information 174 may take on a variety of other formats with a variety of other contents in addition to the above-noted first format 176, second format 182, third format 188, and fourth format 194. For instance, the format and content may vary depending on the corresponding chirp purpose. Thus, the above examples are merely for purposes of illustration and should not be construed as limiting.

Figure 6:
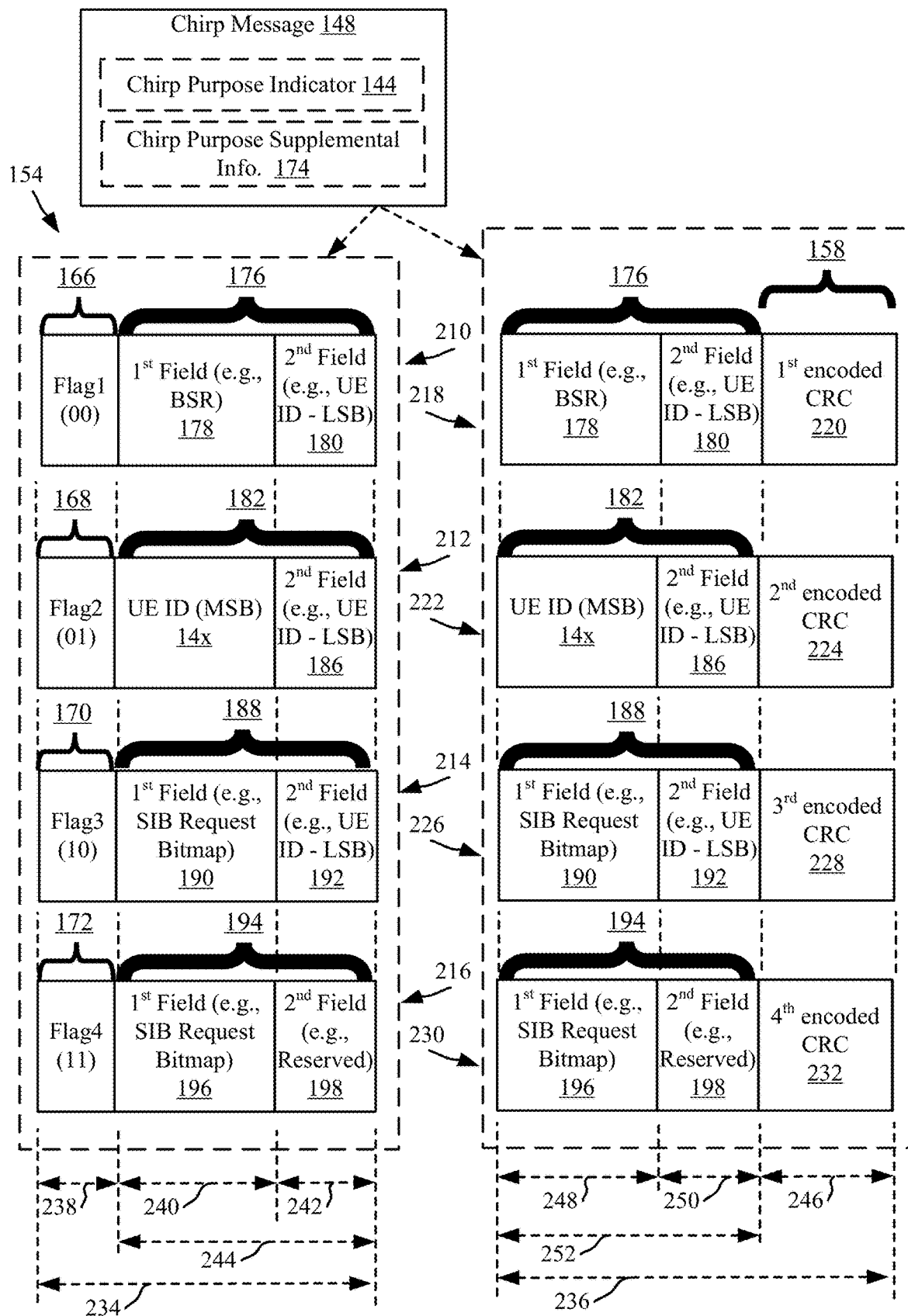
FIG. 6 is a schematic diagram of an aspect of a chirp message including the chirp purpose indicator and the chirp supplemental information, and corresponding example implementations of different formats of the same.

Referring to FIG. 6, chirp message 148 may have any one of a plurality of different formats and contents depending on the mechanism used to include chirp purpose indicator 144, as described at a high level above with respect to FIG. 3, and depending on the chirp purpose and corresponding chirp purpose supplemental information 174, as described at a high level above with respect to FIG. 4.

For example, in the case of chirp purpose indicator 144 being in the form of purpose-specific flag 154, various formats of chirp message 148 may include: a first format 210 for a random access request having Flag1 indicator 166 and first format 176 of chirp purpose supplemental information 174; a second format 212 for a mobility tracking request having Flag2 indicator 168 and second format 182 of chirp purpose supplemental information 174; a third format 214 for a SIB-on-demand request (unicast) having Flag3 indicator 170 and third format 188 of chirp purpose supplemental information 174; and, a fourth format 216 for a SIB-on-demand request (broadcast) having Flag4 indicator 172 and fourth format 194 of chirp purpose supplemental information 174.

Further, for example, in the case of chirp purpose indicator 144 being in the form of purpose-specific encoded CRC message 158 (e.g., CRC 160 encoded with, or otherwise determined from, purpose-specific coding function 162, see FIG. 2), various formats of chirp message 148 may include: a first format 218 for a random access request having a first encoded CRC 220 and first format 176 of chirp purpose supplemental information 174; a second format 222 for a mobility tracking request having a second encoded CRC 224 and second format 182 of chirp purpose supplemental information 174; a third format 226 for a SIB-on-demand request (unicast) having a third encoded CRC 228 and third format 188 of chirp purpose supplemental information 174; and, a fourth format 230 for a SIB-on-demand request (broadcast) having a fourth encoded CRC 232 and fourth format 194 of chirp purpose supplemental information 174. In this example, first encoded CRC 220, second encoded CRC 224, third encoded CRC 228, and fourth encoded CRC 232 may be different CRC messages encoded with different coding sequences corresponding to the respective chirp purpose, such as different ones of the CRC coding masks described above in Table 2 with respect to FIG. 2. Other possible formats can be used as well, such as formats 218, 222, 226, 230 without corresponding encoded CRCs 220, 224, 228, 232 (e.g., where a random access sequence of the chirp message 148 is used as the chirp purpose indicator).

Additionally, in some aspects, the different formats of chirp message 148 including chirp purpose indicator 144 and chirp purpose supplemental information 174 may have an overall message size (in bits, e.g., message size 234 and message size 236) that may be the same across different formats, or that may vary from one format to another, depending on a particular implementation. Similarly, each field size (in bits, e.g., flag indicator field size 238, first field size 240, second field size 242, purpose-specific supplemental information field size 244, and encoded CRC indicator field size 246, first field size 248, second field size 250, purpose-specific supplemental information field size 252) within each format may have a same size, or may have a different size, depending on a particular implementation. For example, in some implementations where improving UE 110 and base station 105 efficiency is a priority, then the overall message size and field sizes may be consistent, which may allow UE 110 to be more efficient in that it generates a certain size message or field. This also may allow base station 105 be more efficient by knowing, or determining, in advance the size of each message or field. In other aspects, for example, where providing additional and/or variable information may be a priority, then the message size and/or one or more field sizes may be variable depending on the content desired to be conveyed.

Thus, chirp message 148 including chirp purpose indicator 144 and chirp purpose supplemental information 174 may take on a variety of formats with a variety of other contents. The above formats are one set of examples, however, other formats in addition to the above-noted formats may be utilized. For example, different types of chirp purpose indicator 144 may be included in chirp signal 142 in different manners, e.g., other types or combinations of coding or signaling the chirp purpose indicator 144 may be utilized. Further, for instance, other types of formats and other contents may be used to define chirp signal 142 that may vary depending on the corresponding chirp purpose. Accordingly, the above examples are merely for purposes of illustration and should not be construed as limiting.

Figure 7:
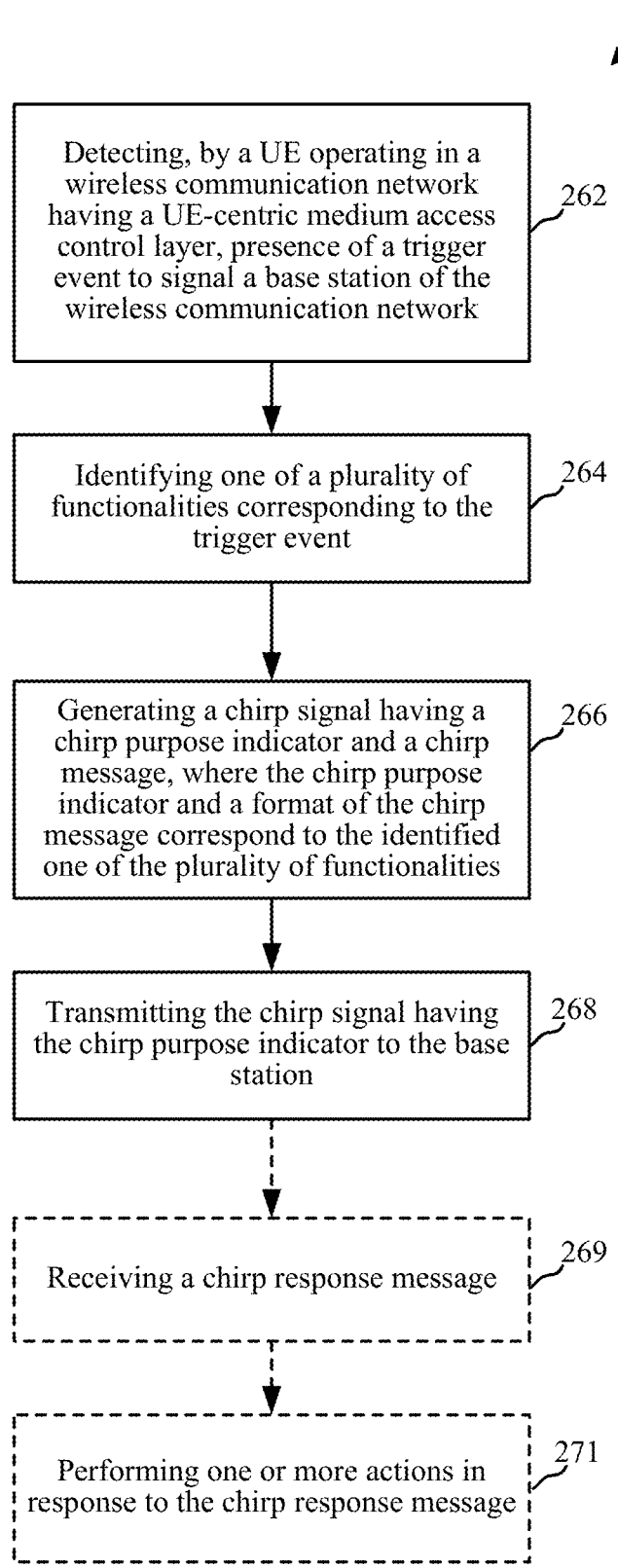
FIG. 7 is a flowchart of an aspect of a method of the UE signaling a network entity, such as a base station, in the wireless communication network using the chirp signal including the chirp purpose indicator.
Figure 8:
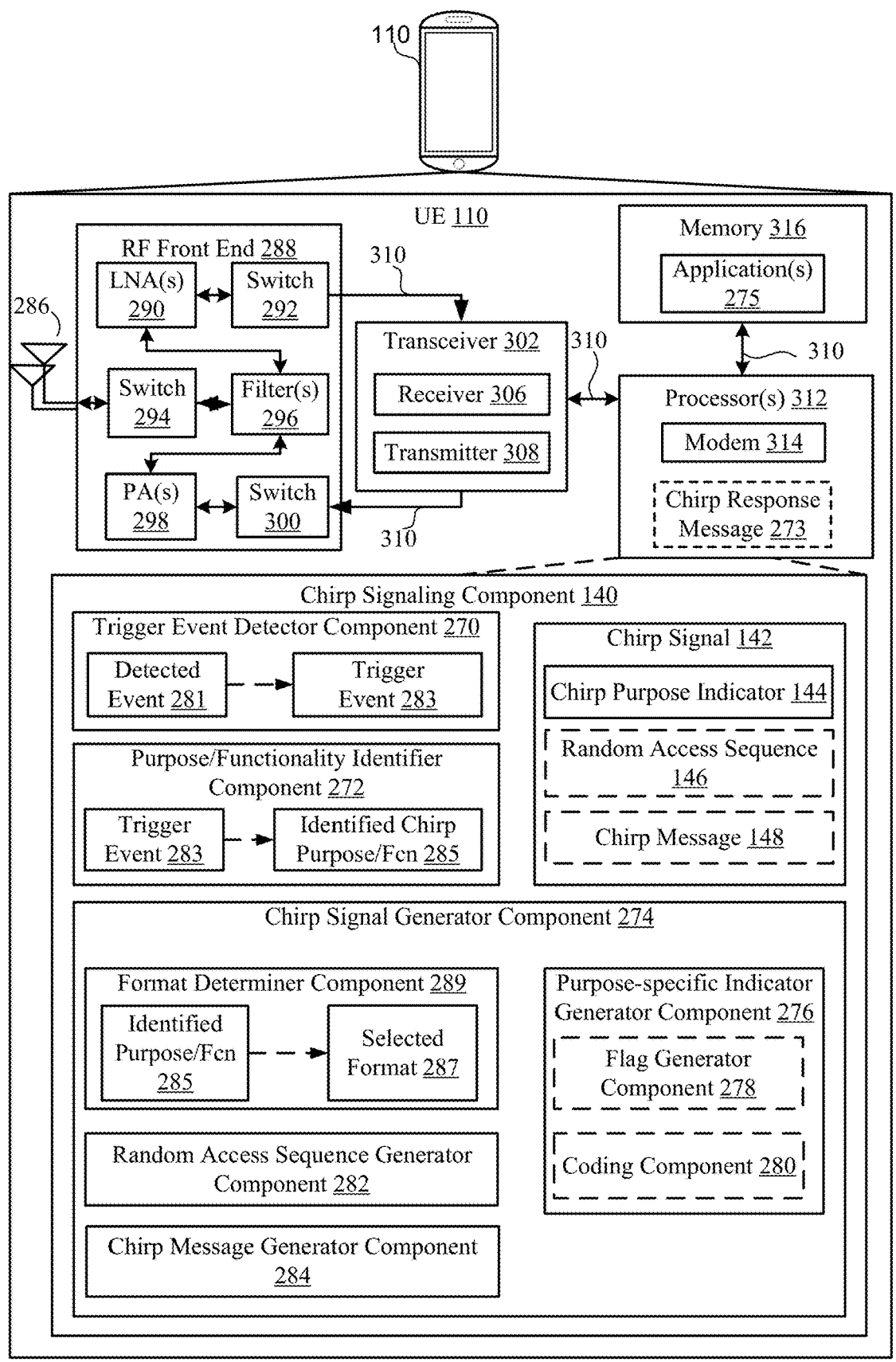
FIG. 8 is a schematic diagram of an aspect of an implementation of various components of the UE configured for signaling the network entity, such as the base station, in the wireless communication network using the chirp signal including the chirp purpose indicator.

Referring to FIGS. 7 and 8, in another aspect, UE 110 may utilize chirp signal 142 having chirp purpose indicator 144, in any of the aspects described above, in a method 260 to signal a network entity. For clarity, method 260 is described below with reference to one or more of the aspects described with reference to FIGS. 1-6. In some examples, UE 110 may execute one or more of the components described below, which may be implemented and/or defined in one or more processors 312, or in one or more sets of codes or instructions stored on a computer-readable medium (e.g., memory 316) as software or firmware and executable by processor 312, or programmed directly into a hardware element such as a module of processor 312, to control one or more components of UE 110 to perform the functions described below.

For example, at block 262, method 260 may include detecting, by the UE operating in a wireless communication network having a UE-centric medium access control layer, presence of a trigger event to signal a base station of the wireless communication network. For instance, in an aspect, UE 110 may execute chirp signaling component 140 and/or trigger event detector component 270 to detect presence of a trigger event 283 to signal base station 105 of wireless communication network 100. As UE 110 may be operating in wireless communication network 100 having a UE-centric medium access control layer, UE 110 may signal base station 105 to request various information that base station 105 may otherwise, in a non-UE-centric (or network-centric) medium access control layer implementation, broadcast or send autonomously or without a request from UE 110. In one example that should not be construed as limiting, trigger event detector component 270 may include a processor, or computer-executable instructions stored on a computer-readable medium and executable by a processor, configured to identify one or more events occurring within the processing system of UE 110, e.g., detected event 281. For example, trigger event detector component 270 may monitor one or more protocol layers of a protocol stack of UE 110 and look for, or receive notification of, certain data or messages occurring at the one or more protocol layers, e.g., associated with a given function or purpose related to chirp signal 142. Such data or messages may be previously identified and stored in memory 316 of UE 110, or may be dynamically updated via over-the-air messaging and stored in memory 316. In an example, upon identifying one or more detected events 281, trigger event detector component 270 may compare a respective detected event 281 to a selected trigger event 283, selected from a plurality of trigger events, to determine if there is a match. If so, for example, then trigger event detector component 270 may be configured to identify detected event 281 as trigger event 283, and accordingly initiate generation and transmission of chirp signal 142. If there is not a match, for example, then trigger event detector component 270 may be configured to continue the monitoring operation.

For example, in an aspect, detecting presence of detected trigger event 283 may be related to an identified chirp purpose/function 285, such as a system information request purpose or function, which may be identified from among a plurality of chirp purposes or functions. For instance, upon powering on, UE 110 may tune one or more radio resources to one or more synchronizations channels and/or to one or more broadcast channels to obtain one or more signals carrying a limited number of parameters that may be used for initial access to a cell of base station 105. Such limited number of parameters may include, but are not limited to, one or more of downlink system bandwidth, a Physical Hybrid ARQ Indicator Channel structure, a number of most significant bits (e.g., 8 bits) of the System Frame Number, a master information block (MIB), etc. In an aspect, the one or more radio resources may include, but are not limited to, receiver chain resources including one or more antennas 286, one or more RF front ends 288, one or more transceivers 302, etc. In an aspect, the one or more synchronizations channels may include, but are not limited to, a primary synchronization channel and/or a secondary synchronization channel. In an aspect, the broadcast channel may include, but is not limited to, a physical broadcast channel (PBCH).

In an aspect, upon receiving the synchronization signal from a cell of base station 105, UE 110 may acquire a timing of the network from the synchronization signal, and in response to acquiring the timing of the network, transmit a pilot signal. The pilot signal transmitted by a UE 110 may be concurrently receivable by a plurality of cells (e.g., base stations 105) within the network. Each of the plurality of cells may measure a strength of the pilot signal, and the network (e.g., one or more of the base stations 105 and/or a central node within the core network 115) may determine a serving cell for UE 110. As such, in this case, UE 110 executing chirp signaling component 140 and/or trigger event detector component 270 may detect one or more of the above events, e.g., obtaining synchronization signals or network timing, or transmitting a pilot signal, and based on associations (e.g., stored in memory 316) of such detected events 281 with a corresponding trigger event 283, correlate one or more such detected events 281 to a respective trigger event 283 to signal a cell of base station 105 of the wireless communication network 100. In this example, for instance, trigger event 283 may be associated with a system information request purpose or function, e.g., identified chirp purpose/function 285, which may lead to transmitting chirp signal 142 to request one or more SIBs, enabling the network to forego periodically broadcasting the system information in an unprompted manner (as in a network-centric MAC layer implementation) and enabling UE 110 and the network to conserve power.

In an example, UE 110 executing chirp signaling component 140 and/or trigger event detector component 270 may be configured with other stored events that are associated with different types of system information requests (e.g., for any available SIB information), and hence likewise associated with a trigger event corresponding to a SIB request to signal a cell of base station 105.

Also, in another aspect, detecting presence of trigger event 283 may be related to a different type of identified chirp purpose/function 285, such as a random access request purpose or function. For example, UE 110 may execute at least one application that generates data for transmission to base station 105 and/or wireless communication network 100. In this case, the generated transmission data may be stored in a transmission queue, buffer, or memory, such as in a modem 314 or a memory 316 of UE 110, and modem 314 may be configured to generate a buffer status report (BSR) that identifies an amount of data in the transmission queue, buffer, or memory (e.g., in memory 316). In order to obtain transmission resources from a cell of base station 105, UE 110 can be configured to transmit the BSR to the cell of base station 105. As such, in this case, UE 110 executing chirp signaling component 140 and/or trigger event detector component 270 may monitor one or more protocols layers of UE 110 and detect one or more of the above events, e.g., identification of data in a transmission queue, buffer, or memory, and/or a size of such data with respect to a threshold, generation of a BSR, etc., and based on stored associations of such detected events 281 with a corresponding trigger event 283, correlate one or more such detected events 281 to the corresponding trigger event 283 to signal a cell of base station 105 of the wireless communication network 100. In this example, for instance, trigger event 283 may be associated with identified chirp purpose/function 285 of a random access purpose or function, which may lead to transmitting chirp signal 142 to request transmission resources, thus enabling UE 110 and the network to conserve power.

In an example, UE 110 executing chirp signaling component 140 and/or trigger event detector component 270 may be configured with other stored events that are associated with different types of access requests, and hence likewise associated with a trigger event corresponding to a random access request to signal a cell of base station 105.

Additionally, in a further aspect, detecting presence of trigger event 283 may be related to an identified chirp purpose/function 285 such as a mobility tracking purpose or function. For example, UE 110 may determine to handover to a new zone (e.g., a plurality of cells having a same operating frequency and timing, etc., minimizing UE involvement in handovers from cell to cell). In this example, UE 110 may determine to signal the global zone identifier (ID) group information to the network, and/or UE 110 may determine to acquire system information for the new zone. Such a handover may be initiated by UE 110, or based on receiving a command from a serving base station of a current zone or a target base station of a new zone. As such, in this case, UE 110 executing chirp signaling component 140 and/or trigger event detector component 270 may detect one or more of the above events, e.g., the above noted handover events, messages, or commands, and based on stored associations of one or more of such detected events 281 with a corresponding trigger event 283, can correlate one or more such detected events 281 to the corresponding trigger event 283 to signal a cell of base station 105 of the wireless communication network. In this example, for instance, trigger event 283 may be associated with a mobility tracking purpose or function, which may lead to transmitting chirp signal 142 to signal the global zone ID group information and/or request the system information of the new zone, enabling UE 110 and the network to conserve power.

In an example, UE 110 executing chirp signaling component 140 and/or trigger event detector component 270 may be configured with other stored events that are associated with different types of mobility tracking purposes or functions, and hence likewise associated with a trigger event corresponding to a mobility tracking request to signal a cell of base station 105.

Additionally, in a further aspect, detecting presence of trigger event 283 may be related to an identified chirp purpose/function 285 such as an on-demand SIB request. For example, UE 110 may execute at least one application that requests the selected SIBs from base station 105 and/or wireless communication network 100. UE 110 could generate a list of SIBs to receive in terms of SIB request bitmap 200 and include this bitmap in chirp message 148 so the base station 105 can determine the SIBs for including in a chirp response message or other unicast or broadcast message.

Returning to method 260, at block 264, method 260 may include identifying one of a plurality of functionalities corresponding to the trigger event. For example, in an aspect, UE 110 may execute chirp signaling component 140 and/or purpose/functionality identifier component 272 to identify one of a plurality of functionalities, e.g., identified chirp purpose/function 285, corresponding to trigger event 283. For instance, as described above, UE 110 may include, in memory 316, stored associations between one or more events that may be detected by trigger event detector component 270 and one or more trigger events corresponding to one or more purposes or functionalities for which chirp signal 142 may be transmitted to base station 105. As such, purpose/functionality identifier component 272 can communicate with trigger event detector component 270, (or they may be an integral component), to receive the identified trigger event 283 and match it to a corresponding identified chirp purpose/function 285 selected from a plurality of purposes or functions. For instance, purpose/functionality identifier component 272 may be configured to identify at least one of a random access-related event, a mobility tracking-related event, or a system information-related event, and/or to correlate such events to respective chirp signal purposes or functions. For instance, purpose/functionality identifier component 272 can be configured to identify a random access purpose or function corresponding to the random access-related event, a mobility tracking purpose or function corresponding to the mobility tracking-related event, a system information request function corresponding to the system information-related event, etc.

Further, at block 266, method 260 may include generating a chirp signal having a chirp purpose indicator and a chirp message, where the chirp purpose indicator and a format of the chirp message correspond to the identified one of the plurality of functionalities. For example, in an aspect, UE 110 may execute chirp signaling component 140 and/or chirp signal generator component 274 (and/or one or more of its subcomponents) to generate chirp signal 142 having the chirp purpose indicator 144 and chirp message 148, where the chirp purpose indicator 144 and a format of the chirp message 148 correspond to identified chirp purpose/function 285 from among the plurality of possible chirp purposes/functions. In an aspect, the chirp message 148 can be a fixed size chirp message 148 that is of the same size for a given chirp purpose/function, though the contents, configuration, number of fields, size of the fields, etc. of the chirp message 148 may be modified for a given chirp purpose/function. In particular, chirp signal generator component 274 may include a purpose-specific indicator generator component 276 configured to communicate with purpose/functionality identifier component 272 to obtain identified chirp purpose/function 285 associated with identified trigger event 283, and, optionally, with a format determiner component 289 to obtain selected format 287 associated with identified trigger event 283. Moreover, in some aspects, purpose-specific indicator generator component 276 may be configured to communicate with random access sequence generator component 282 that operates to generate random access sequence 146, and/or to communicate with chirp message generator component 284 that operates to generate chirp message 148 in order to generate a format of chirp purpose indicator 144 to identify the formatting of the contents of chirp signal 142 (e.g., of chirp message 148 and/or other portions of chirp signal 142).

For instance, in one example that should not be construed as limiting, chirp signal generator component 274 may include format determiner component 289 in communication with purpose/functionality identifier component 272, and thus may be aware of the identified chirp purpose or function that has been detected and identified as described above. Accordingly, based on stored rules or associations, format determiner component 289 can identify a particular format to be used to generate chirp signal 142 (e.g., and/or a chirp message 148 portion of the chirp signal 142), and chirp purpose indicator 144, based at least in part on the identified chirp purpose or function. Further, format determiner component 289 may additionally identify a particular format to be used to generate chirp signal 142 based a pre-established or otherwise known configuration, e.g., the manner in which chirp purpose indicator 144 is to be included in chirp signal. For example, format determiner component 289 may execute different sets of formatting rules if chirp purpose indicator 144 is to be included (e.g., by adding, attaching, combining, etc.) in chirp signal 142 separate from random access sequence 146 and/or chirp message 148, or as a part of random access sequence 146 and/or chirp message 148, and/or further based on the mechanism used (e.g., flag, coding, etc.) to add chirp purpose indicator 144 to random access sequence 146 and/or chirp message 148.

Moreover, based on the format determined by format determiner component 289, chirp signaling component 140 and/or chirp signal generator component 274 may operate one or any combination of purpose-specific indicator generator component 276, random access sequence generator component 282, or chirp message generator component 284 to generate chirp signal 142 having at least chirp purpose indicator 144 to identify the formatting of the contents of chirp signal 142.

For instance, purpose-specific indicator generator component 276 may include, but is not limited to, a flag generator component 278 having instructions and rules to enable generation of a selected flag value from a plurality of flag values, where the selected flag value corresponds to the identified one of the plurality of chirp purposes or functionalities. As such, in one aspect, chirp signaling component 140 and/or chirp signal generator component 274 may operate flag generator component 278 and chirp message generator component 284 to generate purpose-specific flagged chirp message 156, including but not limited to first format 210, second format 212, third format 214, and fourth format 216. In particular, flag generator component 278 may be configured to generate purpose-specific flag 154 having a selected flag value from a plurality of flag values, where the selected flag value corresponds to the identified one of the plurality of chirp purposes or functionalities, and chirp message generator component 284 may be configured to generate chirp message 148 and add purpose-specific flag 154 to chirp message 148 to define purpose-specific flagged chirp message 156 and, at least in part, the chirp signal 142.

Additionally or alternatively, for example, purpose-specific indicator generator component 276 may include, but is not limited to, a coding component 280 having instructions, coding rules, and/or coding sequences to enable generation of a selected purpose-specific coding function (e.g., purpose-specific coding function 150, and/or purpose-specific coding function 162) from a plurality of purpose-specific coding functions to define an encoded message, where the selected purpose-specific coding function corresponds to the identified one of the plurality of functionalities. As such, in one aspect, chirp signaling component 140 and/or chirp signal generator component 274 may operate coding component 280 and random access sequence generator component 282 to generate purpose-specific encoded random access sequence 152. In particular, random access sequence generator component 282 may be configured to generate a random access sequence by randomly selecting one of a plurality of known random access sequences (or selecting a random access sequence based on an identified chirp purpose), and/or coding component 280 may be configured to encode the random access sequence with a selected purpose-specific coding function 150 from a plurality of purpose-specific coding functions to define encoded random access sequence 152, where the selected purpose-specific coding function 150 corresponding to the identified one of the plurality of chirp purposes or functionalities to define, at least in part, chirp signal 142. As such, the respective one of the plurality of chirp purposes or functions may be determined by UE 110 by successfully decoding the purpose-specific encoded random access sequence 152.

Alternatively, chirp signaling component 140 and/or chirp signal generator component 274 may operate coding component 280 and chirp message generator component 284 to generate purpose-specific encoded CRC chirp message 164, including but not limited to first format 218, second format 222, third format 226, and fourth format 230. In particular, coding component 280 may be configured to generate CRC 160 based on chirp signal 142, and to encode CRC 160 with, or determine CRC 160 from, a selected purpose-specific coding function 162 from a plurality of purpose-specific coding functions to define purpose-specific encoded CRC message 158. Then, chirp message generator component 284 may be configured to generate chirp message 148, and to add purpose-specific encoded CRC message 158 to chirp message 148 to define purpose-specific encoded CRC chirp message 164 and, at least in part, the chirp signal 142. As such, the one of the plurality of chirp purposes or functions may be determined by UE 110 by successfully decoding purpose-specific encoded CRC chirp message 164.

Additionally, regarding method 260 at block 266 for generating chirp signal 142, as is evident from the above examples, chirp signal 142 generated by chirp signal generator component 274 may vary in content, e.g., depending on the corresponding identified chirp purpose/function 285 and/or selected format 287. Moreover, the same or different content that may be contained within the same or different fields of chirp signal 142 may have a fixed size, or may have a dynamic, variable size. Examples of such varied contents and formats of chirp signal 142 are discussed above with respect to FIGS. 1-6.

In other words, UE 110 implementing method 260 at block 266 for generating chirp signal 142 may operate format determiner component 289 to execute format rules to generate any one of the formats of chirp signal 142, chirp purpose indicator 144, random access sequence 146, or chirp message 148, as discussed above with respect to FIGS. 1-6.

Additionally, for example, at block 268, method 260 may include transmitting the chirp signal having the chirp purpose indicator to the base station. For example, in an aspect, UE 110 may execute chirp signaling component 140 and/or one or more transmit chain components (e.g., modem 314, transceiver 302, RF front end 288, antennas 286) to transmit chirp signal 142 having chirp purpose indicator 144 to base station 105. For instance, chirp signal 142 may take any of the formats discussed above.

Optionally, at block 269, method 260 may further include receiving a chirp response message, and, at block 271, performing one or more actions in response to the chirp response message. For example, in an aspect, UE 110 may execute one or more receive chain components (e.g., antennas 286, RF front end 288, transceiver 302, and/or modem 314, etc.) to receive chirp response message 273 from base station 105. Chirp response message 273 may include different message contents depending on the purpose of the corresponding chirp signal 142. Moreover, in an aspect, UE 110 may execute a corresponding one or more applications 275 and/or one or more other components of UE 110 related to the chirp purpose and the received contents of chirp response message 273.

For example, the one or more applications 275 may include applications or services on UE 110, such as but not limited to a voice call application, a data call (e.g., short message service, multi-media message service) application, cell or zone selection, reselection, and handover applications or components, etc. For instance, in the case of identified chirp purpose/function 285 being related to random access, UE 110 may receive chirp response message 273 including identification of transmit resources and, in response, may perform the actions of operating one or more transmit chain components (as described above) based on the received transmit resources to transmit all or some portion of data generated by one or more applications 275 and stored in a transmit queue of UE 110.

In another non-limiting example, in the case of a system information request based on the operation of cell or zone selection, reselection, and handover applications or components, UE 110 may receive chirp response message 273 including one or more sets of system information (e.g., one or more SIBs), and in response may utilize such information to perform the actions of operating one or more transmit and/or receive chain components (as described above) to establish and maintain a dedicated communication channel with base station 105 (e.g., UE 110 transitions from an RRC common state to an RRC dedicated state), and/or UE 110 may perform intra-frequency and/or inter-frequency and/or inter-radio access technology measurements, or access a home eNodeB (e.g., femtocell), or obtain MBMS control information associated with one or more MBSFN areas, or perform any other function related to acquiring system information. Further, for instance, in the case of mobility tracking, UE 110 may perform the actions of neighbor zone measurement and/or transmitting a chirp signal to the neighbor zone for a SIB request or for random access.

Referring specifically to FIG. 8, one example of an implementation of UE 110 may include a variety of components, such as one or more processors 312 and memory 316 and transceiver 302 in communication via one or more buses 310, which may operate in conjunction with chirp signaling component 140 to enable one or more of the functions described herein related to including chirp purpose indicator 144 in chirp signal 142. Further, the one or more processors 312, modem 314, memory 316, transceiver 302, RF front end 288 and one or more antennas 286, may be configured to support voice and/or data calls (simultaneously or non-simultaneously) in one or more radio access technologies.

In an aspect, the one or more processors 312 can include a modem 314 that uses one or more modem processors. The various functions related to chirp signaling component 140 may be included in modem 314 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 314 associated with chirp signaling component 140 may be performed by transceiver 302.

Also, memory 316 may be configured to store data used herein and/or local versions of applications or chirp signaling component 140 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining chirp signaling component 140 and/or one or more of its subcomponents, and/or data associated therewith, when UE 110 is operating at least one processor 312 to execute chirp signaling component 140 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 105. Additionally, receiver 306 may process such received signals, and also may obtain measurements of the signals, such as, but not limited to, Ec/Io, SNR, RSRP, RSSI, etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 110 may include RF front end 288, which may operate in communication with one or more antennas 286 and transceiver 302 for receiving and transmitting radio transmissions, for example, wireless communications transmitted by at least one base station 105 or wireless transmissions (e.g., chirp signal 142) transmitted by UE 110. RF front end 288 may be connected to one or more antennas 286 and can include one or more low-noise amplifiers (LNAs) 290, one or more switches 292, 294, 300, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 300 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292, 294, 300 to select a transmit or receive path using a specified filter 296, LNA 290, and/or PA 298, based on a configuration as specified by transceiver 302 and/or processor 312.

As such, transceiver 302 may be configured to transmit and receive wireless signals through one or more antennas 286 via RF front end 288. In an aspect, transceiver may be tuned to operate at specified frequencies such that UE 110 can communicate with, for example, one or more base stations 105 or one or more cells associated with one or more base stations 105. In an aspect, for example, modem 314 can configure transceiver 302 to operate at a specified frequency and power level based on the UE configuration of the UE 110 and the communication protocol used by modem 314.

In an aspect, modem 314 can be a multiband-multimode modem, which can process digital data and communicate with transceiver 302 such that the digital data is sent and received using transceiver 302. In an aspect, modem 314 can be multiband and be configured to support multiple frequency bands for a specific communications protocol. In an aspect, modem 314 can be multimode and be configured to support multiple operating networks and communications protocols. In an aspect, modem 314 can control one or more components of UE 110 (e.g., RF front end 288, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 9:
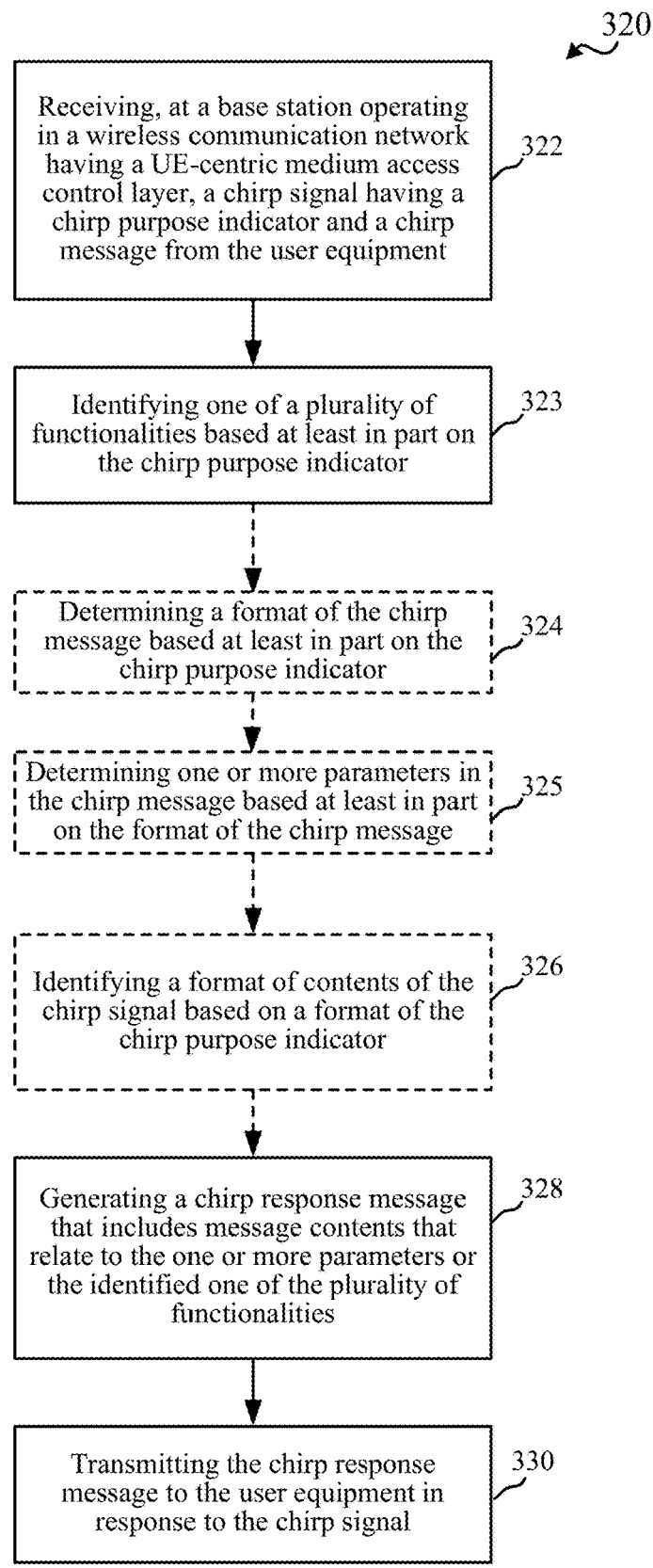
FIG. 9 is a flowchart of an aspect of a method of operating a base station to communication with a user equipment, such as for operating a base station to respond to the chirp signal including the chirp purpose indicator as described herein.
Figure 10:
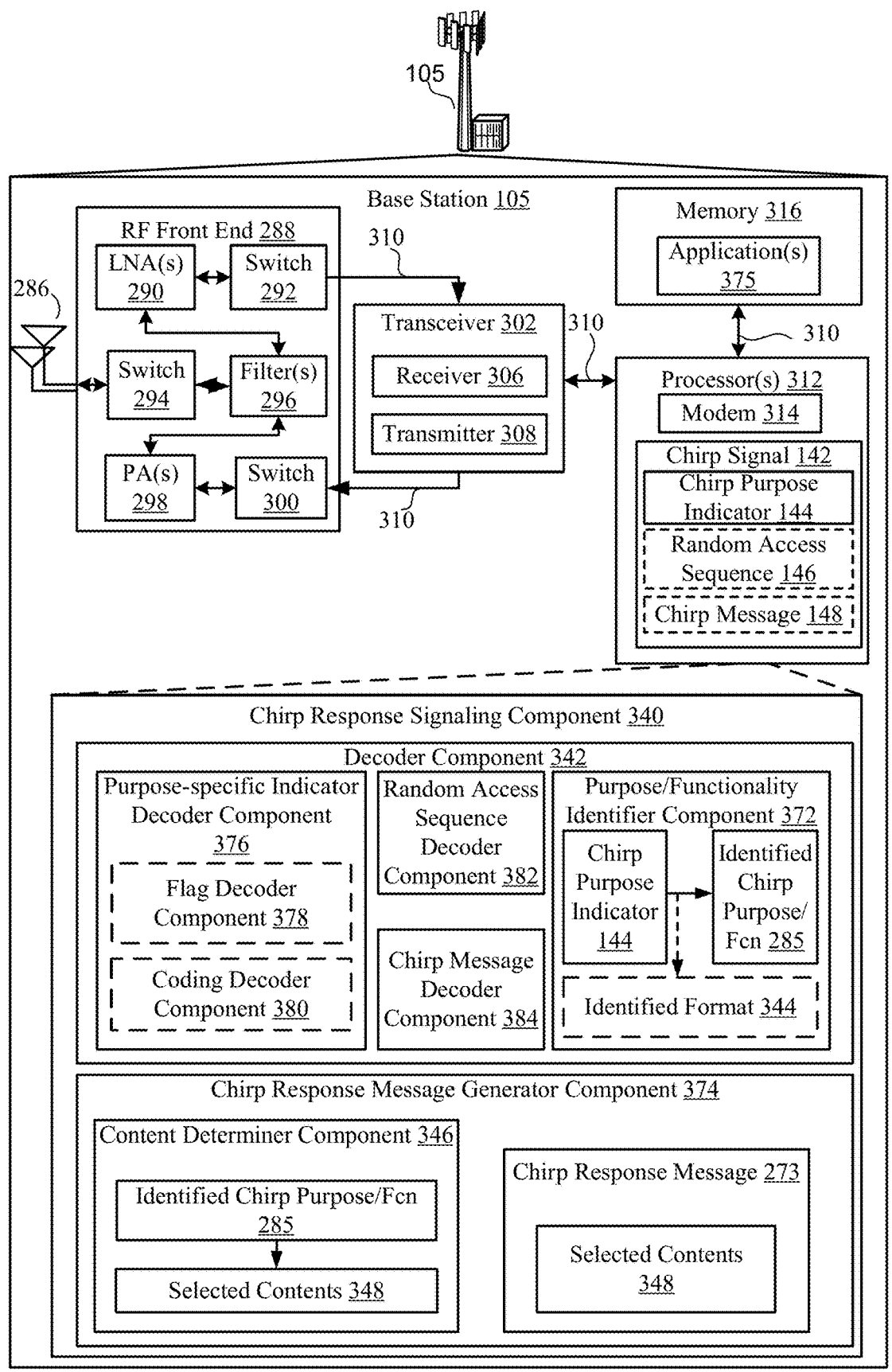
FIG. 10 is a schematic diagram of an aspect of an implementation of various components of the base station configured for communication with a user equipment, such as for operating a base station to respond to the chirp signal including the chirp purpose indicator as described herein.

Referring to FIGS. 9 and 10, a method 320 (FIG. 9) and corresponding components (FIG. 10) are described for operating base station 105 to respond to chirp signal 142 including chirp purpose indicator 144 as described herein.

At block 322, method 320 includes receiving, at the base station operating in a wireless communication network having a UE-centric medium access control layer, a chirp signal having a chirp purpose indicator and an optional chirp message from the user equipment. For example, in an aspect, base station 105 operating in a wireless communication network having a UE-centric medium access control layer may operate one or more receive chain components (e.g., antennas 286, RF front end 288, transceiver 302, processor 312, and/or modem 314) to receive chirp signal 142 having chirp purpose indicator 144, and optionally the chirp message 148, from user equipment 110. As described, the chirp signal 142 may be received based on (e.g., in response to) a broadcast signal from the base station 105 that may include information for synchronizing timing with the base station, as described.

At block 323, method 320 includes identifying one of a plurality of functionalities based at least in part on the chirp purpose indicator. For example, in an aspect, base station 105 may operate a decoder component 342, including at least a purpose-specific indicator decoder component 376 (e.g., including flag decoder component 378 and/or coding decoder component 380) and a purpose/functionality identifier component 372, to identify one of a plurality of chirp purposes or functionalities, e.g., identified chirp purpose or function 285, based at least in part on chirp purpose indicator 144. Optionally, to obtain identified chirp purpose or function 285, decoder component 342 may also operate random access sequence decoder component 382 and/or chirp message decoder component 384. In some aspects, in the operation of purpose-specific indicator decoder component 376 (e.g., including flag decoder component 378 and/or coding decoder component 380), random access sequence decoder component 382 and/or chirp message decoder component 384 may be based on a reverse or inverse of the operation or a reverse or inverse of the algorithm or coding scheme used by UE 110 in coding chirp signal 142, chirp purpose indicator 144, random access sequence 146, and/or chirp message 148. Further, in some aspects, the operation of flag decoder component 378 may be based on matching the encoded or decoded chirp purpose indicator 144 with a respective one of a set of known flag values, which are mapped to corresponding ones of a set of known chirp purpose indicators 144 that each correspond to a respective identified chirp purpose or function 285.

Optionally, at block 324, method 320 includes determining a format of the chirp message based at least in part on the chirp purpose indicator. For example, in an aspect, base station 105 may operate a decoder component 342, including at least a purpose-specific indicator decoder component 376 (e.g., including flag decoder component 378 and/or coding decoder component 380) and a purpose/functionality identifier component 372, to determine the format of the chirp message 148 based at least in part on the chirp purpose indicator 144. In an example, base station 105 may operate decoder component 342 and/or purpose/functionality identifier component 372 to identify a format 344 and corresponding contents of chirp signal 142 or related chirp message 148 based on the chirp purpose indicator 144 (e.g., a value, format, etc. of the chirp purpose indicator). Again, as discussed above, as chirp purpose indicator 144 may be correlated to a known value, format, etc. and content of a corresponding chirp signal 142, the recognition of a known chirp purpose indicator 144 can be correlated to an identified format 344 of chirp signal 142, random access sequence 146, and/or chirp message 148. In a specific example, decoder component 342 and/or purpose/functionality identifier component 372 may identify format 344 as a format 176, 182, 188, 194 based at least in part on determining the chirp purpose indicator 144.

Optionally, at block 325, method 320 includes determining one or more parameters in the chirp message based at least in part on the format of the chirp message. For example, in an aspect, base station 105 may operate a decoder component 342, including at least a purpose-specific indicator decoder component 376 (e.g., including flag decoder component 378 and/or coding decoder component 380) and a purpose/functionality identifier component 372, to determine the one or more parameters in the chirp message 148 based at least in part on the format 344 of the chirp message 148. In an example, base station 105 may operate decoder component 342 and/or purpose/functionality identifier component 372 to identify the one or more parameters as one or more fields in the chirp message 148 based on the identified format 344 (e.g., first field 178 and second field 180 for format 176, first field 184 and second field 186 for format 182, first field 190 and second field 192 for format 188, first field 196 and second field 198 for format 194, etc.). Accordingly, for example, base station 105 may operate decoder component 342 and/or purpose/functionality identifier component 372 to determine values in the associated fields (e.g., the one or more parameters) to generate a chirp response message (e.g., in determining selected contents 348, as described herein).

Optionally, at block 326, method 320 includes identifying a format of contents of the chirp signal based on a format of the chirp purpose indicator. For example, in an aspect, base station 105 may operate decoder component 342 and/or purpose/functionality identifier component 372 to identify a format 344 and corresponding contents of chirp signal 142 based on a format of chirp purpose indicator 144. Again, as discussed above, as chirp purpose indicator 144 may be correlated to a known format and content of a corresponding chirp signal 142, the recognition of a known chirp purpose indicator 144 can be correlated to an identified format 344 of chirp signal 142, random access sequence 146, and/or chirp message 148.

At block 328, method 320 includes generating a chirp response message that includes message contents that relate to the one or more parameters or the identified one of the plurality of functionalities. For example, in an aspect, base station 105 may operate chirp response generator component 374 and/or content determiner component 346 to generate chirp response message 273 that includes selected contents 348 that relate to the one or more parameters or the identified one of the plurality of chirp purposes or functions 285. In an aspect, selected contents 348 depend on identified format 344 of chirp purpose indicator 144 and further on the data contained within the contents of random access sequence 146 and/or chirp message 148, which are correlated to identified chirp purpose or function 285.

For instance, in the case of identified chirp purpose/function 285 being related to random access, and chirp message 148 including a BSR, chirp response generator component 374 may generate chirp response message 273 with selected contents 348 including identification of transmit resources for use by UE 110 to transmit all or some portion of data stored in a transmit queue as reported by the BSR.

In another non-limiting example, in the case of a system information request based on the operation of cell or zone selection, reselection, or handover, and/or chirp message 148 including SIB request bitmap 200, chirp response generator component 374 may generate chirp response message 273 with selected contents 348 including one or more sets of system information (e.g., one or more SIBs) useful for performing the actions of operating one or more transmit and/or receive chain components (as described above) to at least one of: establish and maintain a dedicated communication channel with base station 105 UE 110 transitions from an RRC common state to an RRC dedicated state); perform intra-frequency and/or inter-frequency and/or inter-radio access technology measurements, or access a home eNodeB (e.g., femtocell); to obtain multimedia broadcast multicast service (MBMS) control information associated with one or more multicast-broadcast single-frequency network (MBSFN) areas; perform any other function related to acquiring system information; etc.

Further, for instance, in the case of mobility tracking-related chirp signal 142 and chirp message including zone ID information, chirp response generator component 374 may generate chirp response message 273 with selected contents 348 including neighbor SIB information to allow UE 110 to perform neighbor zone measurements and/or allow UE 110 to transmit a chirp signal to the neighbor zone for random access.

At block 330, method 320 includes transmitting the chirp response message to the user equipment in response to the chirp signal. For example, in an aspect, base station 105 may operate one or more transmit chain components (e.g., modem 314, processor 312, transceiver 302, RF front end 288, and antennas 286, etc.) to transmit chirp response message 273 to UE 110 in response to chirp signal 142.

Additionally, referring to FIG. 10, base station 105 may include some components similar to those described above with respect to UE 110, such as antennas 286, RF front end 288, LNAs 290, switches 292, 294, and 300, filters 296, PAs 298, transceiver 302 including receiver 306 and transmitter 308, processors 312, modem 314, and memory 316. For example, these components may operate in a similar manner as described above, however, these components on base station 105 operate to receive and process wireless RF signals from UE 110 (and/or other base stations 105) and to transmit wireless RF signals to UE 110 (and/or other base stations 105).

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of a user equipment (UE) to signal a base station, comprising:
    detecting, by the UE operating in a wireless communication network having a UE-centric medium access control layer, presence of a trigger event to signal the base station of the wireless communication network;

identifying one of a plurality of functions corresponding to the trigger event;

generating a chirp signal having a chirp purpose indicator and a fixed size chirp message including chip purpose supplemental information corresponding to the one of the plurality of functions, wherein the chirp purpose indicator indicates one of the plurality of functions to be performed in association with the chirp signal and wherein the generating includes selecting the chirp purpose indicator and a format of the fixed size chirp message according to the identified one of a plurality of functions and out of a plurality of chirp purpose indicators and formats each corresponding to the plurality of functions, so that the chirp purpose indicator and the format of the fixed size chirp message correspond to the identified one of the plurality of functions; and transmitting the chirp signal to the base station.

2. The method of claim 1, wherein generating the chirp signal further comprises:

generating the chirp purpose indicator as a flag having a selected flag value from a plurality of flag values, wherein the selected flag value corresponds to the identified one of the plurality of functions.

3. The method of claim 1, wherein generating the chirp signal further comprises:

encoding, as a function of the chirp purpose indicator, a cyclic redundancy check (CRC) for the chirp signal; and adding the encoded CRC to the chirp signal for transmission with the chirp signal.

4. The method of claim 1, wherein generating the chirp signal further comprises:

generating, as a function of the chirp purpose indicator, a random access sequence; and adding the random access sequence to the chirp signal for transmission with the chirp signal.

5. The method of claim 1, wherein generating the chirp signal further comprises:

generating the fixed size chirp message having the chirp purpose supplemental information from a plurality of chirp purpose supplemental information.

6. The method of claim 5, wherein generating the fixed size chirp message further comprises selecting the chirp purpose supplemental information from one or more of a buffer status report, at least a portion of a UE identifier, or an identifier of a requested system information block (SIB).

7. The method of claim 6, wherein the portion of the UE identifier comprises one or more of a set of least significant bits of the UE identifier or a set of most significant bits of the UE identifier.

8. The method of claim 5, wherein generating the fixed size chirp message further comprises generating a plurality of fields each corresponding to different supplemental information or to a null field, wherein one or more of the plurality of fields have a fixed field size for each of the plurality of functions.

9. The method of claim 1, wherein:

detecting the presence of the trigger event further comprises identifying a random access-related event, a mobility tracking-related event, or a system information-related event; and identifying the one of the plurality of functions corresponding to the trigger event further comprises identifying at least one of a random access function corresponding to the random access-related event, a mobility tracking function corresponding to the mobility tracking-related event, or a system information request function corresponding to the system information-related event.

10. The method of claim 1, wherein generating the chirp signal further comprises one of:

generating a first random access sequence and the fixed size chirp message having a first chirp purpose supplemental information corresponding to a random access function;

generating a second random access sequence and the fixed size chirp message having a second chirp purpose supplemental information corresponding to a mobility tracking function;

generating a third random access sequence and the fixed size chirp message having a third chirp purpose supplemental information corresponding to a system information function associated with a unicast response from the base station; or generating a fourth random access sequence and the fixed size chirp message having a fourth chirp purpose supplemental information corresponding to a system information function associated with a broadcast response from the base station.

11. The method of claim 1, further comprising:

generating a format of the chirp purpose indicator to identify the format of the contents of the chirp signal.

12. An apparatus configured to signal a base station, comprising:

a transceiver having a receiving and a transmitter respectively for receiving and transmitting wireless signals in a wireless communication network having a UE-centric medium access control layer;

a memory having one or more instructions;

a processor in communication with the memory and the transceiver, wherein the processor is configured to:

detect presence of a trigger event to signal the base station of the wireless communication network;

identify one of a plurality of functions corresponding to the trigger event;

generate a chirp signal having a chirp purpose indicator and a fixed size chirp message including chirp purpose supplemental information corresponding to the one of the plurality of functions, wherein the chirp purpose indicator indicates one of the plurality of functions to be performed in association with the chirp signal and wherein the generating includes selecting the chirp purpose indicator and a format of the fixed size chirp message according to the identified one of a plurality of functions and out of a plurality of chirp purpose indicators and formats each corresponding to the plurality of functions, so that the chirp purpose indicator and the format of the fixed size chirp message correspond to the identified one of the plurality of functions; and transmit, via the transceiver, the chirp signal to the base station.

13. The apparatus of claim 12, wherein the processor is configured to generate the chirp purpose indicator as a flag having a selected flag value from a plurality of flag values, wherein the selected flag value corresponds to the identified one of the plurality of functions.

14. The apparatus of claim 12, wherein the processor is configured to:

encode, as a function of the chirp purpose indicator, a cyclic redundancy check (CRC) for the chirp signal; and add the encoded CRC to the chirp signal for transmission with the chirp signal.

15. The apparatus of claim 12, wherein the processor is configured to:
    generate, as a function of the chirp purpose indicator, a random access sequence; and
    add the random access sequence to the chirp signal for transmission with the chirp signal.

16. A method of operating a base station to communicate with a user equipment (UE), comprising:
    receiving, at the base station operating in a wireless communication network having a UE-centric medium access control layer, a chirp signal from the UE, wherein the chirp signal comprises a chirp purpose indicator and a fixed size chirp message including chirp purpose supplemental information and wherein the chirp purpose indicator indicates one of the plurality of functions to be performed in association with the chirp signal;
    identifying one of a plurality of functions based at least in part on the chirp purpose indicator;
    determining a format of the fixed size chirp message based at least in part on the chirp purpose indicator;
    wherein the chirp purpose indicator and the format of the fixed size chirp message are determined out of a plurality of chirp purpose indicators and formats each corresponding to the plurality of functions determining the chirp purpose supplemental information in the fixed size chirp message based at least in part on the format of the fixed size chirp message;
    generating a chirp response message that includes message contents that relate to the chirp purpose supplemental information and the identified one of the plurality of functions; and
    transmitting the chirp response message to the user equipment in response to the chirp signal.

17. The method of claim 16, wherein receiving the chirp signal further comprises:
    receiving the fixed size chirp message including a flag having a selected flag value from a plurality of flag values, wherein the selected flag value corresponds to the identified one of the plurality of functions.

18. The method of claim 16, wherein identifying the one of a plurality of functions is further based on determining a cyclic redundancy check (CRC) associated with the chirp signal.

19. The method of claim 16, wherein identifying the one of a plurality of functions is further based on determining a random access sequence associated with the chirp signal.

20. The method of claim 16, wherein receiving the chirp signal further comprises:
    receiving the fixed size chirp message having the chirp purpose supplemental information from a plurality of chirp purpose supplemental information, wherein the chirp purpose supplemental information corresponds to the identified one of the plurality of functions.

21. The method of claim 20, wherein receiving the fixed size chirp message having the chirp purpose supplemental information further comprises the chirp purpose supplemental information being one or more of a buffer status report, at least a portion of a UE identifier, or an identifier of a requested system information block (SIB).

22. The method of claim 20, wherein the portion of the UE identifier comprises one or more of a set of least significant bits of the UE identifier or a set of most significant bits of the UE identifier.

23. The method of claim 20, wherein receiving the fixed size chirp message having the chirp purpose supplemental information further comprises receiving a plurality of fields each corresponding to different supplemental information or to a null field, wherein one or more of the plurality of fields have a fixed field size for each of the plurality of functions.

24. The method of claim 16, wherein identifying the one of the plurality of functions further comprises identifying at least one of a random access function corresponding to a random access-related event, a mobility tracking function corresponding to a mobility tracking-related event, or a system information request function corresponding to a system information-related event.

25. The method of claim 16, wherein receiving the chirp signal further comprises one of:
    receiving a first random access sequence and the fixed size chirp message having a first chirp purpose supplemental information corresponding to a random access function; or
    receiving a second random access sequence and the fixed size chirp message having a second chirp purpose supplemental information corresponding to a mobility tracking function; or
    receiving a third random access sequence and the fixed size chirp message having a third chirp purpose supplemental information corresponding to a system information function associated with a unicast response from the base station; or
    receiving a fourth random access sequence and the fixed size chirp message having a fourth chirp purpose supplemental information corresponding to a system information function associated with a broadcast response from the base station.

26. The method of claim 16, further comprising identifying a format of contents of the chirp signal based on a format of the chirp purpose indicator.

27. An apparatus to communicate with a user equipment, comprising:
    a transceiver configured to receive a chirp signal, having a chirp purpose indicator and a fixed size chirp message including chirp purpose supplemental information corresponding to one of the plurality of functions, from the user equipment, wherein the chirp purpose indicator indicates one of the plurality of functions to be performed in association with the chirp signal, and wherein the transceiver is operating in a wireless communication network having a UE-centric medium access control layer;
    a memory having one or more instructions;
    a processor in communication with the memory and the transceiver, wherein the processor is configured to:
        identify one of a plurality of functions based at least in part on the chirp purpose indicator;
        determine a format of the fixed size chirp message based at least in part on the chirp purpose indicator;
        wherein the chirp purpose indicator and the format of the fixed size chirp message are determined out of a plurality of chirp purpose indicators and formats each corresponding to the plurality of functions determine the chirp purpose supplemental information in the fixed size chirp message based at least in part on the format of the fixed size chirp message; and
        generate a chirp response message that includes message contents that relate to the chirp purpose supplemental information and the identified one of the plurality of functions; and wherein the transceiver is configured to transmit the chirp response message to the user equipment in response to the chirp signal.

28. The apparatus of claim 27, wherein the chirp purpose indicator includes a flag having a selected flag value from a plurality of flag values, wherein the selected flag value corresponds to the identified one of the plurality of functions.

29. The apparatus of claim 27, wherein the processor is configured to identify the one of a plurality of functions further based on determining a cyclic redundancy check (CRC) associated with the chirp signal.

* * * * *